United States Patent
Ihara

(10) Patent No.: US 7,277,557 B2
(45) Date of Patent: Oct. 2, 2007

(54) IMAGE PROCESSING APPARATUS, IMAGE PROCESSING METHOD, AND STORAGE MEDIUM OF IMAGE PROCESSING PROGRAM

(75) Inventor: Fujio Ihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 994 days.

(21) Appl. No.: 10/383,646

(22) Filed: Mar. 10, 2003

(65) Prior Publication Data

US 2004/0036924 A1    Feb. 26, 2004

(30) Foreign Application Priority Data

Aug. 23, 2002  (JP)  ............................. 2002-244312
Oct. 28, 2002  (JP)  ............................. 2002-312315

(51) Int. Cl.
*H04K 1/00*  (2006.01)
(52) U.S. Cl. ........................................ 382/100; 380/54
(58) Field of Classification Search ................ 382/100, 382/232; 380/252, 287, 54; 713/176; 358/3.28
See application file for complete search history.

(56) References Cited

U.S. PATENT DOCUMENTS 5,946,414 A * 8/1999 Cass et al. ................... 382/183
6,141,441 A * 10/2000 Cass et al. ................... 382/166
2001/0055390 A1* 12/2001 Hayashi et al. ............. 380/220
2002/0002679 A1* 1/2002 Murakami et al. .......... 713/176

FOREIGN PATENT DOCUMENTS

| EP | 0 851 391 A2 | 7/1998 |
| JP | 11-284833 A | 10/1999 |
| JP | 2000-115523 A | 4/2000 |
| JP | 2001-103281 A | 4/2001 |
| JP | 2001-119558 A | 4/2001 |
| JP | 2001-119562 A | 4/2001 |
| JP | 2001-218005 A | 8/2001 |

* cited by examiner

*Primary Examiner*—Andrew W. Johns
(74) *Attorney, Agent, or Firm*—Morgan, Lewis & Bockius LLP

(57) ABSTRACT

A pattern generating section forms two patterns based on a pattern size, an embedding strength, and a pattern attenuation ratio. When corresponding pixels in two patterns are added to each other, all of elements become zero. When all of pixels in each of patterns are added to each other, the added pixels become zero. Each of patterns has two edges, which include discontinuous pixel values and pass through a center portion of each of patterns in difference directions from each other. Absolute values of pixel values of the patterns are the largest at a center thereof. The absolute values of pixel values of the patterns decrease as being away from the center thereof. A pattern selecting section selects one of the two patterns in response to additional information. A pattern superimposing section superimposes the additional information on the image data to embed it into the image data.

49 Claims, 14 Drawing Sheets

FIG. 2 (A)
ADDITIONAL INFORMATION "1"
| -1 | -1 | -1 | -1 | +1 | +1 | +1 | +1 |
|---|---|---|---|---|---|---|---|
| -1 | -1 | -1 | -1 | +1 | +1 | +1 | +1 |
| -1 | -1 | -1 | -1 | +1 | +1 | +1 | +1 |
| -1 | -1 | -1 | -1 | +1 | +1 | +1 | +1 |
| +1 | +1 | +1 | +1 | -1 | -1 | -1 | -1 |
| +1 | +1 | +1 | +1 | -1 | -1 | -1 | -1 |
| +1 | +1 | +1 | +1 | -1 | -1 | -1 | -1 |
| +1 | +1 | +1 | +1 | -1 | -1 | -1 | -1 |
FIG. 2 (B)
ADDITIONAL INFORMATION "0"
| +1 | +1 | +1 | +1 | -1 | -1 | -1 | -1 |
|---|---|---|---|---|---|---|---|
| +1 | +1 | +1 | +1 | -1 | -1 | -1 | -1 |
| +1 | +1 | +1 | +1 | -1 | -1 | -1 | -1 |
| +1 | +1 | +1 | +1 | -1 | -1 | -1 | -1 |
| -1 | -1 | -1 | -1 | +1 | +1 | +1 | +1 |
| -1 | -1 | -1 | -1 | +1 | +1 | +1 | +1 |
| -1 | -1 | -1 | -1 | +1 | +1 | +1 | +1 |
| -1 | -1 | -1 | -1 | +1 | +1 | +1 | +1 |
FIG. 2 (C)
$$\begin{cases} \times C \exp(-\alpha\,(|x| + |y|)) & \cdots (1) \\ \times C \exp(-\alpha\,(x^2 + y^2)) & \cdots (2) \end{cases}$$
FIG. 2 (D)
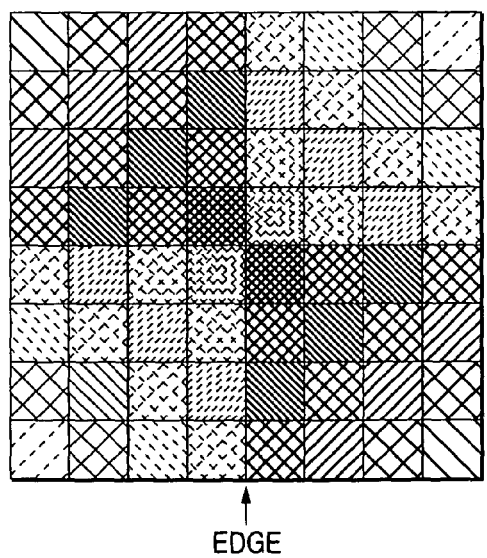
EDGE
FIG. 2 (E)
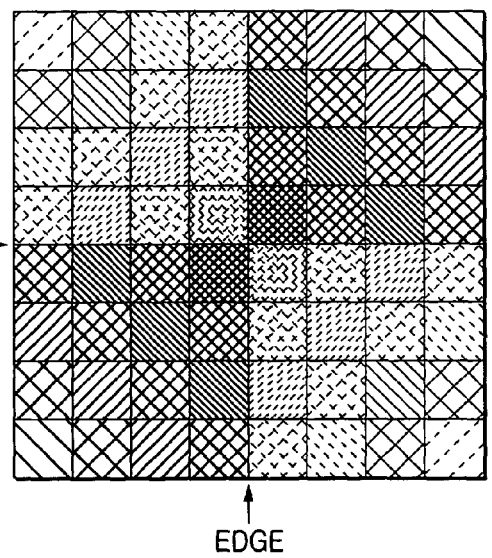
EDGE

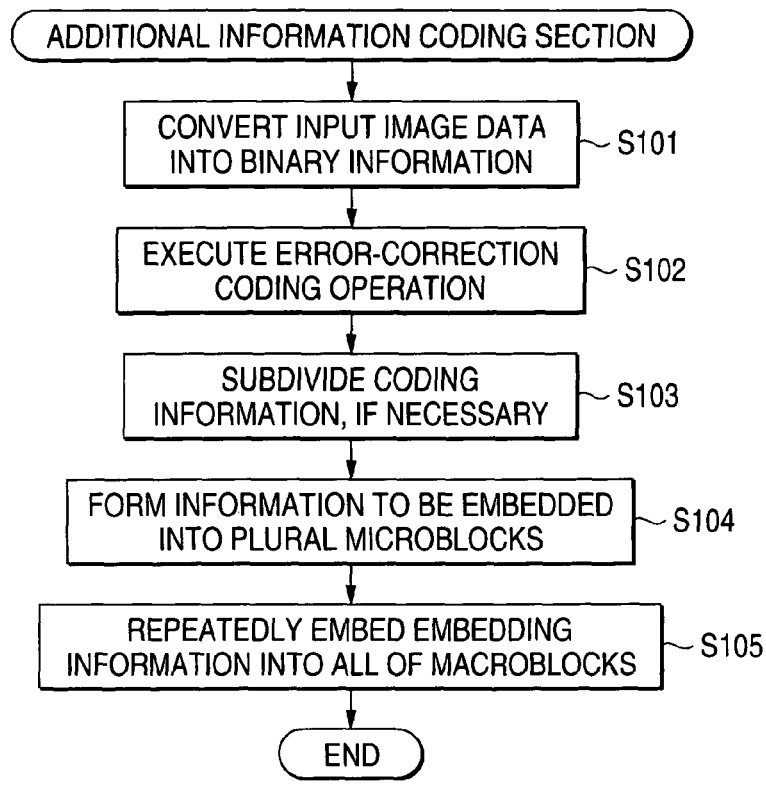
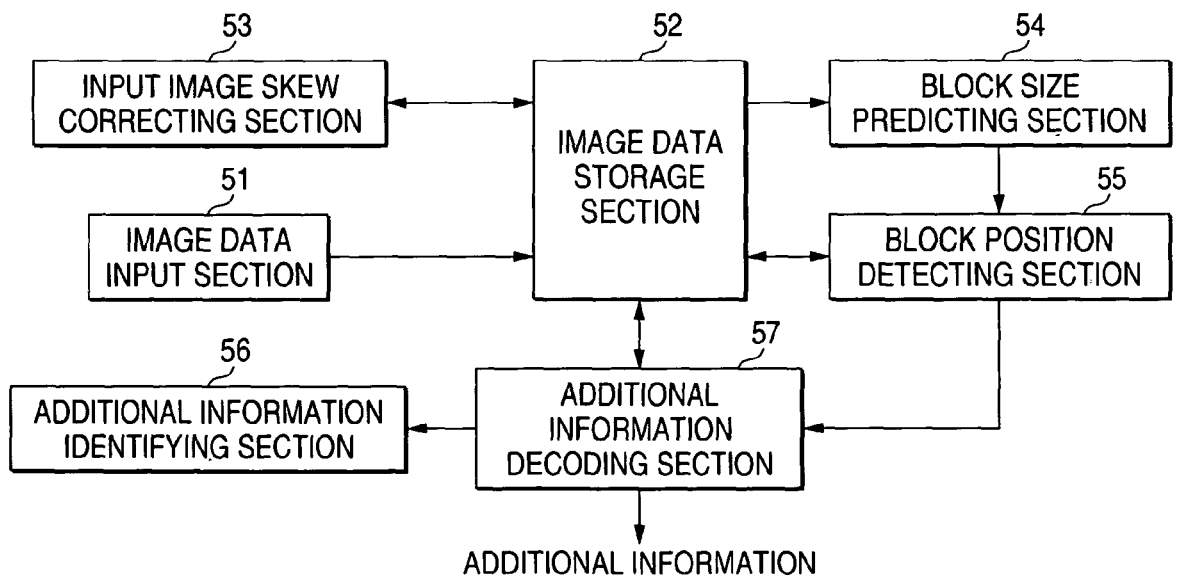

| -1 | -1 | -1 | -1 | +1 | +1 | +1 | +1 |
|----|----|----|----|----|----|----|----|
| -1 | -1 | -1 | -1 | +1 | +1 | +1 | +1 |
| -1 | -1 | -1 | -1 | +1 | +1 | +1 | +1 |
| -1 | -1 | -1 | -1 | +1 | +1 | +1 | +1 |
| +1 | +1 | +1 | +1 | -1 | -1 | -1 | -1 |
| +1 | +1 | +1 | +1 | -1 | -1 | -1 | -1 |
| +1 | +1 | +1 | +1 | -1 | -1 | -1 | -1 |
| +1 | +1 | +1 | +1 | -1 | -1 | -1 | -1 |

| -1 | -1 | -1 | 0 | +1 | +1 | +1 |
|----|----|----|---|----|----|----|
| -1 | -1 | -1 | 0 | +1 | +1 | +1 |
| -1 | -1 | -1 | 0 | +1 | +1 | +1 |
| 0  | 0  | 0  | 0 | 0  | 0  | 0  |
| +1 | +1 | +1 | 0 | -1 | -1 | -1 |
| +1 | +1 | +1 | 0 | -1 | -1 | -1 |
| +1 | +1 | +1 | 0 | -1 | -1 | -1 |

IMAGE PROCESSING APPARATUS, IMAGE PROCESSING METHOD, AND STORAGE MEDIUM OF IMAGE PROCESSING PROGRAM

The present disclosure relates to the subject matter contained in Japanese Patent Application No. 2002-244312 filed on Aug. 23, 2002 and Japanese Patent Application No. 2002-312315 filed on Oct. 28, 2002, which are incorporated herein by reference in its entirety.

BACKGROUND OF THE INVENTION

1. Field of the Invention

The present invention is related to a method and an apparatus for embedding information into an image represented by multi-gradation, and related to a method and an apparatus for detecting information embedded in an image, and also related to a storage medium of an image processing program.

2. Description of the Related Art

Very recently, digital watermarking techniques by which electronic information is added in such a format that this electronic information cannot be visibly recognized by human eyes at a glance have been actively researched/developed. Then, these digital watermarking techniques have been utilized by way of various modes. However, the major digital watermarking techniques have been employed via electronic media, whereas substantially no digital watermarking technique has been used via non-electronic media such as paper. This reason is given as follows. That is, when image data stored in a computer is printed out and thereafter the printed image is scanned to be inputted into the computer, since the image data accepts various image converting operations, there is such a problem that it is practically difficult to detect information from the image data under stable condition while a deterioration of image qualities is suppressed. Concretely speaking, the above-described various image converting operations involve D/A and A/D converting operations by printing and scanning operations; color converting operations; binary processing operations by screening; resolution converting operations required due to differences in resolution of printers and scanners; noise produced during scanning operations in addition to skew; irregular shifts (fluctuations within plane) of pixel positions which are caused by mechanical operations of printers and scanners etc. Also, in the case that a digital camera is employed as an image input device, there is another problem of aberration. However, since precision as to printers, scanners, digital cameras and the like is increased, necessities of digital watermarking techniques are increased which can be applied to printing fields, although these problems are still left.

As a technical trial capable of partially solving such a problem, for example, in accordance with a conventional technique described in JP-A-Hei. 11-284833, additional information is expressed by a direction of pixels which have been painted over within a rectangular area formed by a plurality of pixels. However, in this conventional technique, since the rectangular area formed by the plural pixels is employed in order to represent a 1-bit signal, if an amount of information which is embedded into an entire image is increased, then there are such problems that the size of the rectangular area is decreased and the gradation characteristic is decreased. In addition, the following practical difficulty may be readily supposed. That is, since no specific measure has been taken in order to detect the rectangular area from a printed image, it is practically difficult to actually detect the rectangular area so as to identify the additional information.

Also, in another conventional technique described in JP-A-2001-103281, in such a case that a dither method is employed in a halftone process operation of a printer, an image is binary-processed in the unit of an (n×m) dither matrix, and then, dots are added to four corners of the (n×m) pixels corresponding to this binary-processed image so as to represent additional information. This conventional technique owns such a problem that since the additional information is added in the halftone process operation, this technical idea cannot be applied to another printer capable of executing another halftone process operation different from the above-explained halftone process operation.

Also, any of the above-described two publications (JP-A-Hei. 11-284833, and JP-A-2001-103281) does not consider such a case that resolution achieved during the scanning operation is different from resolution achieved during the embedding operation. As a result, for instance, as to an image which has been enlarged, or reduced after being printed, there is such a problem that additional information cannot be acquired from this printed image.

Also, for instance, both JP-A-2001-119558 and JP-A-2001-119562 disclose both a method for embedding a registration signal so as to detect an enlarging/reducing ratio by utilizing a Fourier transformation with respect to a specific image block, and also a method for embedding additional information in such a manner that a block to be embedded is determined based upon a positional relation of a two-dimensional mask, and then, pattern data is added/subtracted with respect to this determined block. Concretely speaking, a signal having a specific frequency (registration signal) is added to a specific block. Then, the block to which the registration signal has been added is detected from, for instance, an image to which a resolution converting operation has been performed. A detection is made that the frequency of the registration signal has been converted into another frequency, and then, a ratio of the resolution converting operation is obtained from a ratio of these frequencies. In accordance with this conventional technique, even when a geometrical converting operation such as the resolution converting operation is carried out, this converting operation is judged, so that the embedding information can be detected.

However, in this method, first of all, the block into which the registration has been embedded must be found out. It is difficult to find out such a block corresponding to the original block into which the registration signal has been embedded from the image whose resolution has been converted. Also, even if such a block could be detected, the following problem occurs. That is, in order to detect the frequency of the registration signal from the block which has been detected, if the registration signal is not embedded at a certain strength, then the frequency of this registration signal can be hardly detected. If the registration signal is embedded at a certain strength into a predetermined specific block, then a difference in the characteristics of this block becomes conspicuous.

Also, as the method of embedding the additional information, in this method, the additional information is embedded in such a way that a certain pattern is added, or subtracted only to a specific block position based upon two-dimensional mask information. However, if the additional information is easily detectable, then the additional information is strongly embedded to the specific block position. As a result, a difference between this specific block position and the portion where the additional information is not embedded may become conspicuous. Conversely, if the additional information is weakly embedded to the specific block position, then the additional information can be hardly detected. Also, in such a case that the block size used when the additional information is embedded is changed, the following problem may also occur. That is, if this change of the block sizes is not precisely notified, then the additional signal cannot be decoded. For example, in the case that an image output device such as a printer capable of performing a halftone process operation is used, if additional information is embedded based upon such a block size which is excessively smaller than a cell size of the halftone process operation, then substantially no information is left during printing operation. As a result, the block size must be made large substantially equal to the cell size of the halftone process operation. Also, in the case that irregular dot shift occurred within a plane are large, and also positional precision is slightly lowered, such an adjustment that a block size is increased so as to easily detect additional information may be effectively employed. However, in such a case that if the block size is not known on the detection side, then the additional signal cannot be decoded, the management as to the devices provided on the detection side becomes complex.

Furthermore, as to measures with respect to degradation in image qualities, since only an amplitude control of an embedding pattern is merely prepared, if a block size is made large, then a detection ratio of the embedding pattern is increased. However, no measure is taken to such a fact that the resulting image quality is degraded. As a consequence, there is only such a measure that such additional information with a small amplitude is embedded, by which the degradation of the image quality do not become conspicuous, so that this additional information can be hardly detected. In order to compensate for this difficult detection of the additional information, a small amount of information maybe repeatedly embedded into an entire image, and then, this embedded information may be recovered by using a statistical process operation. However, the recovery steps become complex, and the embedding information amount is decreased. Furthermore, since both the registration signal used to detect the enlarging ratio and the information to be transferred are embedded by using the different embedding methods, another problem may occur. That is, the registration signal may interfere with the information to be transferred.

SUMMARY OF THE INVENTION

The present invention has been made to solve the above-described problems, and therefore, has an object to provide an image processing apparatus, an image processing method, and an image processing program storage medium, capable of realizing a technique by which even when an image is printed on paper, such information embedded into this image can be firmly detected/recovered while degradation of an image quality are suppressed to a minimum value, and further, capable of recovering additional information even when various sorts of image input/output devices are widely employed in various combination manners without requiring initial knowledge related to the image output devices.

In accordance with the present invention, additional information is embedded into an image by selecting one of two pattern. At this time, the patterns having the following features are generated. When corresponding pixels in two patterns are added to each other, all of elements become zero. When all of pixels in each of patterns are added to each other, the added pixels become zero. Each of patterns has two edges, which include discontinuous pixel values and pass through a center portion of each of patterns in difference directions (for example, a vertical direction and a horizontal direction) from each other. Preferably, the patterns having the following feature are generated. That is, absolute values of pixel values of the patterns is the largest at a center thereof and the absolute values of pixel values of the patterns decrease as being away from the center thereof. Among these features, one feature in which when all of the pixels in each of the patterns are added to each other, the addition result becomes zero is employed in order that average density before/after the pattern is superimposed is not changed. This feature may achieve such an effect that degradation of an image quality may be suppressed to a minimum limitation. Also, another feature in which when the pixels corresponding to the two patterns are added to each other, all of the elements become zero may imply that polarities of the two patterns are different from each other. This feature may facility introduction of the two edges and detection of the additional information. It should be understood that the patterns may have, for instance, n×m pixels.

An image processing apparatus and an image processing method, which embed these patterns, may perform a process including inputting an input image, inputting additional information to be embedded into the input image, selecting one of two patterns in accordance with the additional information, and superimposing the selected pattern on a designated position in the input image to embed the additional information into the input image. Furthermore, when the patterns are generated, an embedding strength inputting section may input an embedding strength and the two patterns may be generated by using the inputted embedding strength. Based on this embedding strength, an adverse influence with respect to an image quality of an input image and an identifying ratio of embedded additional information may be controlled.

Also, in the case that such a pattern is produced which has a feature that an absolute value of pixel values owned by the patterns is the larger absolute value at a center; and the further the pattern is separated from the center, the smaller the absolute value is increased; and a pattern attenuation ratio is inputted by a pattern attenuation ratio input section, or the pattern attenuation ratio is calculated by a pattern attenuation ratio calculating section, so that the two pattern signals may be generated by employing this pattern attenuation ratio. When a pattern attenuation ratio is calculated, this pattern attenuation ratio may be set in such a manner that a difference of pixel values at a boundary portion between such patterns which are arranged adjacent to each other becomes smaller than a predetermined value. As a consequence, the identifying process operation of the patterns may be carried out in a higher efficiency while an edge is not produced between the patterns. Also, a degradation of image qualities with respect to an input image can be suppressed.

Furthermore, while a pattern size is settable, the image processing apparatus may be arranged in such a manner that a pattern may be embedded into an input image in an arbitrary size. Although a pattern shape is arbitrarily set, this pattern shape may be made of a rectangular shape which is constituted by, for example, n×m pixels. A change of pattern sizes may become effective in order to avoid dropping of information during printing operation in such a way that, in particular, in an electro-photographic type printer for printing an image by turning ON/OFF dots, and in an ink-jet type printer, a pattern size is changed in correspondence to the screen frequency thereof. A pattern size may be set to a small size in such a printer whose screen frequency is high, whereas a pattern size may be preferably set to a large size in the case that an image is outputted by a printer whose screen frequency is small. Furthermore, additional information which is embedded into an input image may be embedded after this additional information has been converted into a predetermined coding format.

Also, an image processing apparatus may be constituted in such a manner that either an embedding strength of the additional information or the pattern attenuation ratio is determined based upon both the inputted additional information and the input image of an area with which the pattern signal corresponding to the additional information is superimposed, and thus the two patterns are generated by employing either the determined embedding strength or the pattern attenuation ratio. Also, since the embedded additional information may be easily recovered/identified, and also, the pattern is superimposed to the input image at a small embedding strength as small as possible, degradation of image qualities which are caused by embedding the pattern at an unnecessarily high strength may be reduced.

Also, while an input image is analyzed, the input image may be corrected (compressed) based upon both an analysis result and an embedding strength in such a manner that a gradation value of the input image is located within a certain range. As a result, it is possible to avoid an overflow/underflow of the gradation value, which is caused by superimposing the pattern to the input image, so that an identification characteristic of the pattern may be improved.

Also, an image processing apparatus and an image processing method for extracting additional information from image data into which the above-described pattern has been embedded in the block unit are featured by that a size of a block is predicted by a block size predicting section from image data inputted into image data input section by utilizing edges of patterns; a position of the block is detected by a block position detecting section by utilizing a correlative characteristic between a mask image formed by extracting only either positive polarity information or negative polarity information, and an image into which additional information has been embedded; and the additional information embedded in the block is identified by an additional information identifying section by utilizing a large/small relationship among summations of pixel values of areas which are subdivided into four subdivided areas by the edges based upon the detected position of the block. Since the prediction of the block size, the detection of the block position, and the identification of the additional information by using these block size and block position are carried out by utilizing the characteristics of all of the patterns, even in such a case that the image data is enlarged, or reduced, and/or a pattern having an arbitrary dimension is embedded in the image data, the additional information can be firmly acquired.

It should be understood that the block size may be alternatively predicted as follows: That is, an edge-extracted image is formed from image data, and furthermore, such an image is formed by extracting edge components along a predetermined direction (for example, both vertical direction and horizontal direction) from the edge-extracted image, so that the block size may be predicted based upon an interval of peak positions of an autocorrelation function of this formed image.

Also, the block position may be alternatively detected in such a manner that a mask image corresponding to the block size predicted by the block size predicting operation is formed; a convolution calculation is carried out between the mask image and the image data; only such a point whose value becomes either a local maximum value or a local minimum value is extracted from an image of the convolution calculation result; the point whose value becomes either the local maximum value or the local minimum value is projected along the vertical direction and the horizontal direction; and the block position may be detected from both the resulting projection waveforms and the predicted block size.

In addition, the additional information may be identified in such a manner that the block whose position has been detected is subdivided into four areas by two edges along predetermined directions, a summation of pixel values existed in each of the four areas is calculated, and the additional information is identified based upon a large/small relationship among the calculated four summation values.

Also, when image data is inputted, an skew of this input image data is corrected by an skew correcting section; and then, the predicting process operation of the block size, the detecting process operation of the block position, and also, the identifying process operation of the additional information may be alternatively carried out by employing the image data after the correcting process operation has been effected. As a result, for example, when the image data is scanned/inputted, even if a skew is slightly produced, the additional information may be firmly acquired. Furthermore, in such a case that the identified additional information has been coded in accordance with a predetermined coding format, this identified additional information may be decoded so as to acquire the original additional information.

As previously explained, since the present invention is applied, both the image processing apparatus and the image processing method can be provided, and further, the digital watermarking technique having the print-resisting characteristic can be provided, while the degradation of the image qualities are suppressed to the minimum allowable values. When the additional signal is detected, most of parameters required while the additional signal is embedded are no longer grasped as initial knowledge, and also, such parameter information need not be received by employing other transfer unit. As a consequence, the present invention can provide both the image processing apparatus and the image processing method, which can be utilized in any combinations of large numbers of image input/output devices.

BRIEF DESCRIPTION OF THE DRAWINGS

FIG. 2 is an explanatory diagram for explaining one example of a pattern to be embedded.

FIG. 5 is a flow chart for explaining an example of operations of an additional information coding section 18 as the additional information embedding side according to the first embodiment of the present invention.

FIG. 6 is a block diagram for indicating one structural example of an additional information extracting device side according to the first embodiment of the present invention.

DETAILED DESCRIPTION OF THE PREFERRED EMBODIMENTS

First Embodiment

Figure 1:
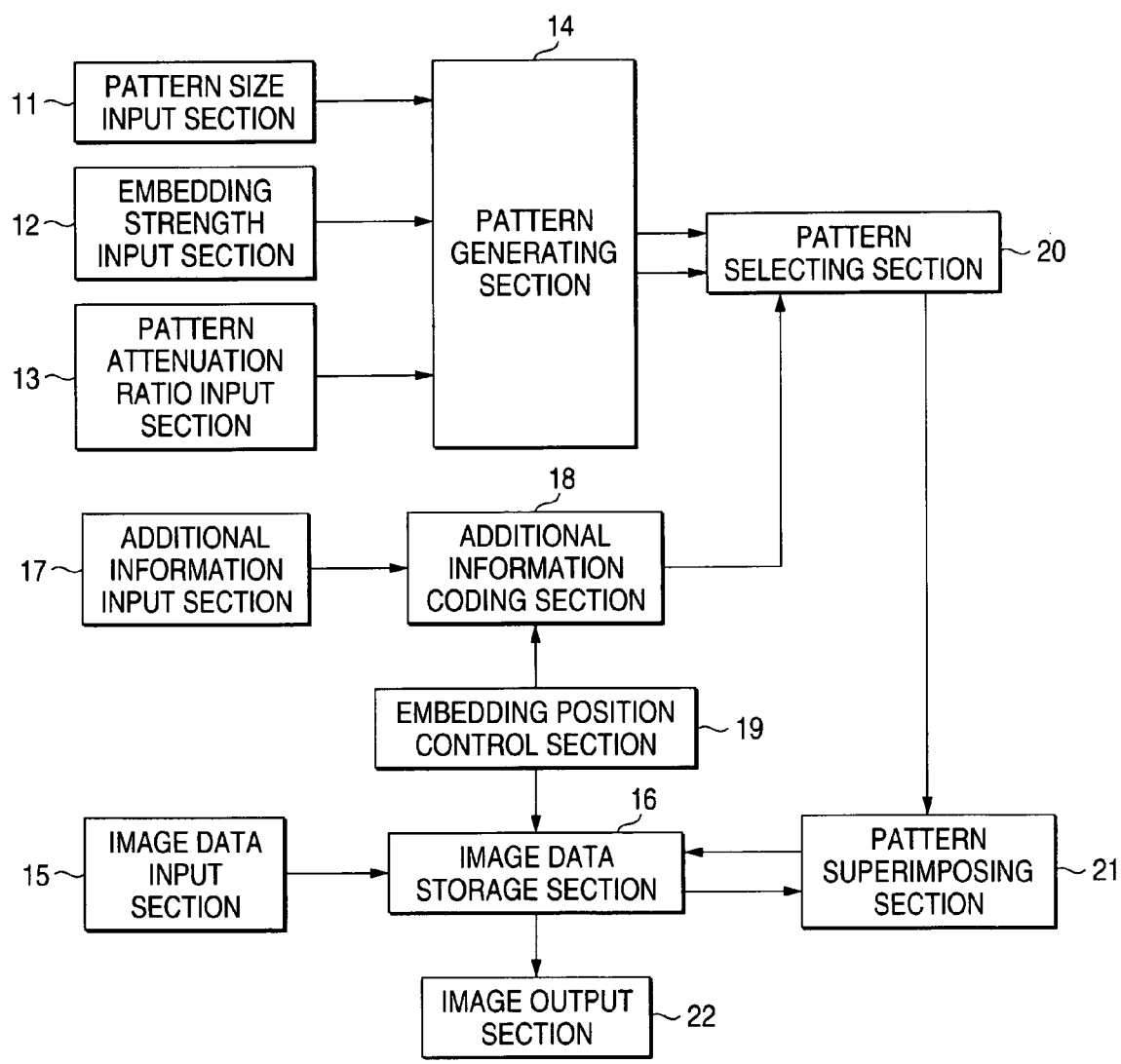
FIG. 1 is a block diagram for indicating one structural example of an additional information embedding side according to a first embodiment of the present invention.

FIG. 1 is a block diagram for indicating one structural example of an additional information embedding side according to a first embodiment of the present invention. In this drawing, reference numeral 11 denotes a pattern size input section; reference numeral 12 indicates an embedding strength input section; reference numeral 13 represents a pattern attenuation ratio input section; reference numeral 14 denotes a pattern generating section; reference numeral 15 denotes an image data input section; reference numeral 16 indicates an image data storage section; reference numeral 17 represents an additional information input section; reference numeral 18 denotes an additional information coding section; reference numeral 19 is an embedding position control section; reference numeral 20 represents a pattern selecting section; reference numeral 21 denotes a pattern superimposing section; and reference numeral 22 indicates an image output section.

The pattern size input section 11 inputs/sets a pattern size designated by a user via a personal computer, an operation panel, or the like, which are not shown. Also, the embedding strength input section 12 inputs/sets an embedding strength designated by the user via the personal computer, the operation panel, or the like, which are not shown. Furthermore, the pattern attenuation ratio input section 13 inputs/sets a pattern attenuation ratio designated by the user via the personal computer, the operation panel, or the like, which are not shown. It should be noted that when fixed values, which are preliminarily set, are utilized, an image processing apparatus may be constituted without providing these units.

The pattern generating section 14 generates two patterns based on the pattern size, the embedding strength, and the pattern attenuation ratio, which have been set. It should also be noted that detailed contents of the pattern generating section 14 will be explained later.

The image data input section 15 accepts image data, which is inputted. The image data input section 15 is provided with, for instance, a communication function, and is capable of acquiring various image data in accordance with various modes, for example, is capable of receiving image data from an external apparatus, or receiving image data via an OS (operating system) from software, or capable of opening a file to read image data. The image data to be inputted corresponds to multi-value data, and may be produced by an arbitrary image such an image formed by a personal computer (not shown), a natural image inputted by a digital camera, or a scanner, or a computer graphics (CG) image. The image data storage section 16 is used to record the input image data, to temporarily hold work data during process operation, and to hold output data.

The additional information input section 17 accepts an input of additional information to be embedded into input image data from various supply sources such as a personal computer, an operation panel, software, and a file, which are not shown. The additional information to be embedded into the input image data may be realized by various sorts of information such as a character string, a numeral, or image data.

The additional information coding section 18 converts the additional information inputted by the additional information input section 17 into a predetermined coding format, and then, generates embedding information, which is actually embedded into image data. It should also be noted that detailed contents of the additional information coding section 18 will be discussed later. Alternatively, the embedding information maybe embedded into the image data without being coded.

The embedding position control section 19 designates a position where the embedding information is embedded into the image data stored in the image data storage section 16 in accordance with a predetermined embedding format.

The pattern selecting section 20 selects any one of the two patterns generated by the pattern generating section 14 based on the embedding information generated by the additional information coding section 18.

The pattern superimposing section 21 superimposes (for example, adds) the pattern selected by the pattern selecting section 20 with respect to an image block, which is positioned at an address of the image data storage section 16 designated by the embedding position control section 19, to embeds the selected pattern into the image data. It should also be understood that when a summation value exceeds a maximum value (for instance, 255), the summation value is set to the maximum value (255), whereas when a summation value becomes a minus value, the summation value is set to zero.

The image output section 22 outputs such an image into which the additional information has been embedded via an image output device such as a printer, software, or a communication line.

As above, the structural example of the additional information embedding side according to the first embodiment of the invention has been described. Next, a major arrangement among the above-described arrangements will now be furthermore described in detail.

First, the pattern generating section 14 will now be explained in detail. The pattern generating section 14 forms the two patterns based upon the values, which are inputted/set by the pattern size input section 11, the embedding strength input section 12, and the pattern attenuation ratio input section 13. The two patterns own the below-mentioned features:

If corresponding pixels in the two patterns are added to each other, then all of elements become zero.

If all of pixels contained in each pattern are added, then the added pixels become zero.

Each of the patterns has a discontinuous pixel value called as "edges". Two or more edges pass a center portion of each pattern and directs different directions from each other. The directions of the edge may be defined by, for example, directions along both a vertical line and a horizontal line.

Furthermore, the patterns may preferably own the following feature:

An absolute value of a pixel value of each pattern becomes the maximum at a center of each pattern. The absolute value of the pixel value of each pattern becomes smaller as departing from the center.

Also, as to shapes of the two patterns, it is assumed here that the following feature is owned:

Each of the two patterns is constituted by a rectangular block having a n×m pixels.

FIG. 2 is an explanatory diagram of an example of patterns to be embedded. As the patterns having the above-described features, there are such patterns indicated in, for instance, FIG. 2. In this case, assuming now that FIG. 2(A) shows a basic pattern, which implies additional information "1", and FIG. 2(B) shows a basic pattern, which implies additional information "0". It is also assumed that all elements of both the basic patterns are multiplied by either a formula (1) or a formula (2) indicated in FIG. 2(C). As a result, such patterns as shown in, for example, FIG. 2(D) and FIG. 2(E) are produced. It should be noted that in FIG. 2(D) and FIG. 2(E), for the sake of easy illustration, differences in density are expressed by differences in hatching shapes.

In this case, a size of a basic pattern is set by the pattern size input section 11. In the example of FIG. 2, the pattern size is exemplified by 8×8. Also, in the above-described formulae (1) and (2), symbol "C" indicates the embedding strength inputted by the embedding strength input section 12, and symbol "α" represents the pattern attenuation ratio set by the pattern attenuation ratio input section 13. Symbol "x" shows a coordinate of an abscissa, and symbol "y" indicates a coordinate of an ordinate, and also a center of a pattern is assumed as an origin.

The features of these patterns are employed in order that the patterns can be easily detected, while adverse influences given to image qualities are suppressed as small as possible.

The patterns can be readily detected by an arrangement of an information detecting side of the present invention (will be explained later). It should also be noted that normally, parameters such as a size of a pattern, an attenuation ratio of a pattern, and an embedding strength of a pattern are set by considering an image quality and a detection ratio with respect to each of image output device. However, it is not necessary for the information detection side (will be described later) to grasp these parameters in advance.

The patterns employed in the present invention are not limited to the above-described pattern example shown in FIG. 2. Desirable function may be employed as the formulae (1) and (2). Specifically, a triangular waveform may be employed in stead of the formulae (1) and (2). Also, the exponential function portions contained in the formulae may be omitted. Alternatively, the patterns indicated in FIG. 2(A) and FIG. 2(B) as it is may be directly employed without employing the formulae. In addition, in the example shown in FIG. 2, the edge directions are defined as the vertical/horizontal directions. Alternatively, for instance, both an edge along a 45-degree direction and an edge along a 135-degree direction may be employed. Namely, an arbitrary edge direction may be employed so long as the edge direction is made coincident with an extraction direction of the edge on a side for extracting additional information (will be explained later).

Next, the additional information coding section 18 will now be described in detail. At first, one example of a coding format (encoding format) used in the present invention will be described. As the coding format, there are a physical format and a logic format. The physical format designates a position and a sequence at and in which formatted embedding information is recorded. The logic format defines how to encode and decode embedded information within a physical format.

Figure 3:
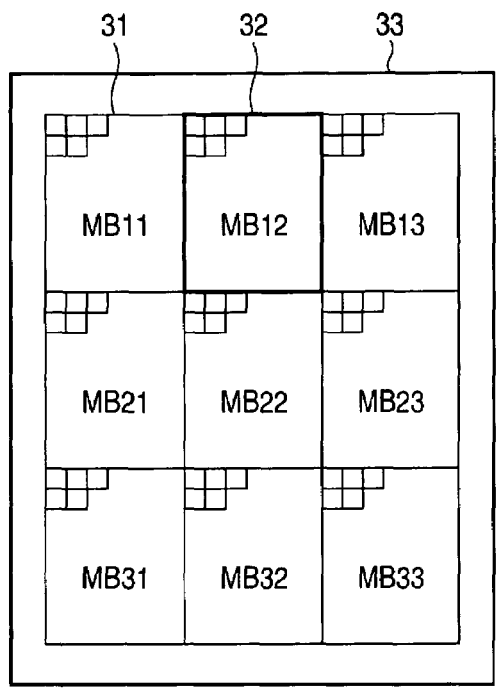
FIG. 3 is an explanatory diagram for explaining one example of a physical format in an example of a coding format used in the present invention.

FIG. 3 is an explanatory diagram of one example of the physical format with respect to an example of the coding format used in the present invention. In this drawing, reference numeral 31 indicates a pattern size, reference numeral 32 represents a macroblock size, and reference numeral 33 shows an input image. The pattern size 31 indicates a dimension of a pattern set by the pattern size input section 11. The macroblock size 32 corresponds to a size defined by collecting the pattern sizes 31 in an Y-column/X-row matrix shape. The input image 33 corresponds to an image into which a pattern is to be embedded.

The embedding position control section 19 calculates a total number of macroblocks, which can be arranged within the input image 33, based upon the size of the input image 33 to be embedded, a previously-set matrix size (Y, X) of macroblocks, and the pattern size 31 to arrange the macroblocks in such a manner that these macroblocks are located as near the input image 33 and close as possible without forming any space. Embedding positions are defined so that the macroblocks are accessed from an upper left direction to a lower right direction. That is, in the example shown in FIG. 3, the access is performed in this order of MB 11, MB 12, MB 13, MB 21, - - -, MB 33. Furthermore, an address control is carried out in an order from an upper left pattern to a lower right pattern in a macroblock.

Since the blocks into which the patterns are embedded are arranged in the above-explained regular manner, a block size and a block position can be easily detected on the side for extracting the additional information (will be explained later).

Figure 4:
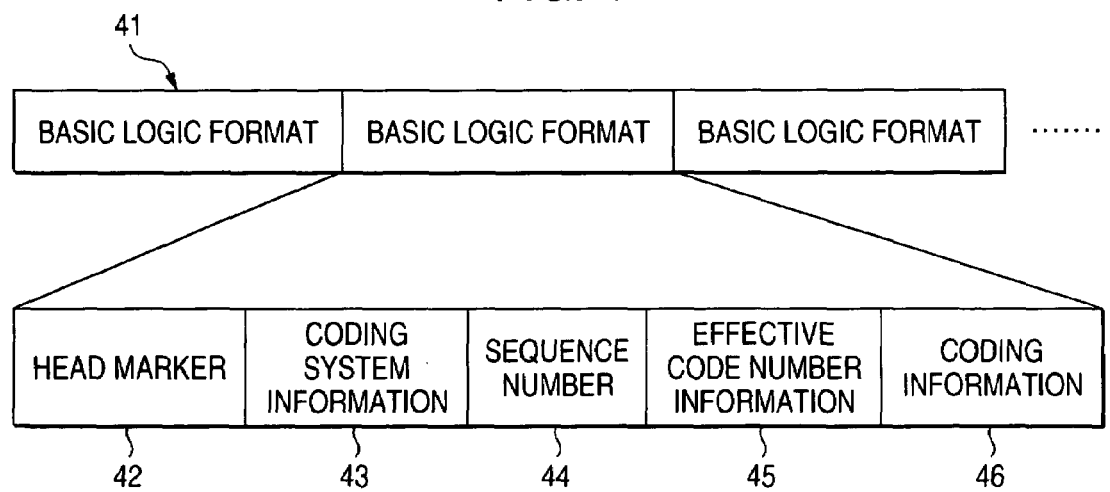
FIG. 4 is an explanatory diagram for explaining one example of a logic format in an example of a coding format used in the present invention.

FIG. 4 is an explanatory diagram of one example of the logic format with respect to one example of the coding format used in the present invention. In the drawing, reference numeral 41 shows a basic logic format, reference numeral 42 indicates a head marker, reference numeral 43 represents coding system information, reference numeral 44 denotes a sequence number, reference numeral 45 shows effective code number information, and also, reference numeral 46 represents coding information.

As represented in FIG. 4, the logic format includes either one or a plurality of the above-described basic logic formats 41. Also, the basic logic format 41 is constructed of the head marker 42, the coding system information 43, the sequence number 44, the effective code number information 45, and the coding information 46. A size of the basic logic format 41 is equal to a size of the macroblock 32, namely X×Y bits. The head marker 42 is used so as to specify the position of this macroblock 32, and is commonly used with resect to all of the macroblocks 32. The coding system information 43 indicates that the coding information 46 (will be explained later) has be coded by using which error correction system. This coding system information 43 is commonly used with respect to all of the macroblocks 32. The sequence number 44 is used when a dimension of additional information received by the additional information input section 17 is such a dimension, which cannot be stored within one macroblock 32. After this additional information is coded, the coded additional information is subdivided into subdivided additional information having such a size, which can be stored in the macroblock 32, and then, sequence numbers are applied to these subdivided additional information in an ascent order from "1." When coded additional information owns such a length, which can be stored into one macroblock 32, the sequence number becomes "1". The effective code number information 45 indicates an effective code number of coding information stored in a final macroblock in the case that coded additional information is subdivided. All of effective code number information of macroblocks other than the final macroblock become equal to "0." It should be understood that the portion, which is error-correction-coded, contains not only the coding information 46, but also both the sequence number 44 and the effective code number information 45.

FIG. 5 is a flow chart for describing an example of operations executed by the additional information coding section 18 provided on the side for embedding the additional information according to the first embodiment of the present invention. In a step S101 of this flow chart, this additional information coding section 18 converts the additional information inputted by the additional information input section 17 into binary information. For instance, when the additional information coding section 18 receives a character string as the additional information, the additional information coding section 18 converts this character string into the ASCII code or the like so as to produce binary information of this character string. In a step S102, the additional information coding section 17 executes the error-correction coding operation with respect to the binary information obtained in the step S101. In a step S103, the additional information coding section 18 performs a calculation as to whether or not coded information may be stored in a single macroblock based upon a code length of this information coded in the step 102, and subdivides the coded information when this coded information cannot be stored in the single macroblock. In a step S104, the additional information coding section 18 adds the head marker 42, the coding system information 43, the sequence number 44 and also, the effective code number information 45 to the subdivided coding information 46 so as to form information as to a plurality of basic logic formats 41. In a step S105, the addition information coding section 18 sequentially embeds the information as to a plurality of basic logic formats 41 formed in the step 104 into all of the macroblocks 32 from the macroblock 32 located at a head position, and repeatedly carries out the embedding operation until the information is embedded into all of the macroblocks 32.

While a concrete example is employed, an example of the above-described operations of the additional information coding section 18 will be furthermore explained. In this example, the following explanations are made. That is, it is so assumed that the physical format is defined by 16 rows×8 columns, namely, Y=16 and X=8. Also, it is assumed that the head marker is defined as 5 bits, and a value of this head marker is "11111." Furthermore, while the coding system is defined as 3 bits and a value of this coding system is "000", it is so assumed that such a Hamming code that a code length thereof is 15 bits and a check bit thereof is 4 bits is designated. Also, the sequence number is defined as 7 bits, and the effective code number is defined as 4 bits.

In the flow chart indicated in FIG. 5, after the additional information has been replaced with the binary information in the step S101, the additional information coding section 18 executes the error-correction coding operation with respect to the binary information obtained in the step S101. If such a Hamming code that the coding length is 15 bits and the check bit is 4 bits is employed, the binary information is derived from the head bit thereof by 11 bits and the check bit of 4 bits is added thereto, so that a Hamming code having a 15-bit length is obtained. This process operation is repeatedly carried out until the final bit of the binary information. It should be understood that when a bit length of binary information is not equal to multiples of 11 bits, shortage of all bits is filled with a value "1" so that the bit length of the binary information is equal to multiples of 11 bits.

In a step S103, the additional information coding section 18 performs the calculation as to whether or not the coded information can be stored in a single macroblock based upon the code length of the information coded in the step S102, and subdivides the coded information when this coded information cannot be stored in the single macroblock. In this example, the macroblock size is 16×8=128; the head marker is 5 bits; the coding system is 3 bits; the sequence number is 7 bits; and the effective code number information is 4 bits, while such a Hamming code that the code length is 15 bits and the check bit is 4 bits is used as the coding system. As a result, both the sequence number and the effective code number information require 15 bits. As a result, an area for the coding information 46 becomes 128−(5+3+15)=105 bits. Accordingly, when the coded information exceeds 105 bits, a plurality of macroblocks are required so as to embed this coded information. If a plurality of macroblocks are required, the coded information is subdivided every 105 bits. Then, in a step S104, the head marker 42, the coding system information 43, the sequence number 44, and the effective code number information 45 are added to the subdivided coding information 46 so as to form a plurality of basic logic formats 41.

In the step S105, the addition information coding section 18 sequentially embeds the information as to a plurality of basic logic formats 41 formed in the step 104 into all of the macroblocks 32 from the macroblock 32 located at the head position, and repeatedly carries out the embedding operation in such a manner that this information about the plural basic logic formats 41 may be embedded into all of these macroblocks 32. For example, as in the example shown in FIG. 3, when a total number of the macroblocks 32 is equal to 9 and a maximum value of the sequence number is equal to 4, the information of the basic logic format 41 of the sequence number 1 is embedded into a macroblock "MB 11"; the information of the basic logic format 41 of the sequence number 2 is embedded into a macroblock "MB 12"; the information of the basic logic format 41 of the sequence number 3 is embedded into a macroblock MB 13"; and the information of the basic logic format 41 of the sequence number 4 is embedded into a macroblock "MB 21." Further, the information of the basic logic format 41 of the sequence number 1 is again embedded into a macroblock "MB 22"; the information of the basic logic format 41 of the sequence number 2 is again embedded into a macroblock "MB 23"; the information of the basic logic format 41 of the sequence number 3 is again embedded into a macroblock "MB 31"; and the information of the basic logic format 41 of the sequence number 4 is again embedded into a macroblock "MB 32." Also, the information of the basic logic format 41 is again embedded into a macroblock "MB 33."

Although will be explained later, in order to decode this additional information, the decoding side may merely grasp only a size (X, Y) of a macroblock and a logic format. It is not necessary for the decoding side to grasp information such as a block size during information embedding operation, resolution of an image output device, and resolution of an image input device. Also, with regard to an image quality, since a pattern whose amplitude is attenuated is employed, although a center portion of the pattern is especially different from an original image, this pattern is embedded into a substantially entire image in an equal interval under correct rule. As a result, even if a user can recognize that the image into which the additional information has been embedded is different from the original image, a sense of incongruity can be suppressed. Also, in such a case that a block size is decreased as small as possible within such a range where a detection ratio is not so dropped or a block size cannot be decreased, since the attenuation ratio is set to a proper ratio value, degradation of the image qualities can be substantially suppressed as compared with that of the original image.

The structural example of the additional information embedding side according to the first embodiment of the present invention has been described. Next, a description will be made on a structural example of the side for extracting the additional information from an image data into which the additional information has been embedded in the unit of a block, according to the first embodiment of the present invention FIG. 6 is a block diagram for indicating one structural example of the side for extracting the additional information according to the first embodiment of the present invention. In this drawing, reference numeral 51 shows an image data input section; reference numeral 52 represents an image data storage section; reference numeral 53 denotes an input image skew correcting section; reference numeral 54 shows a block size predicting section; reference numeral 55 indicates a block position detecting section; reference numeral 56 represents an additional information identifying section; and also, reference numeral 57 is an additional information decoding section. It should be understood that inputted image data is produced by either the image processing apparatus or the image processing method, which are indicated in the above-explained structural example of the additional information embedding side, and corresponds to an image data, which is obtained from an image printed out from a printing device.

The image data input section 51 owns an interface, which interfaces with an image reading device such as a scanner, or a digital camera, and inputs via the interface thereinto print image data into which additional information has been embedded. Also, the image data input section 51 is provided with a function capable of converting compressed print image data into decompressed data in such a case that print image data acquired by an image reading device such as a scanner or a digital camera has been compressed.

The image data storage section 52 stores thereinto the print image data obtained from the image data input section 51, and also stores thereinto calculation results obtained during calculation operation.

Figure 7:
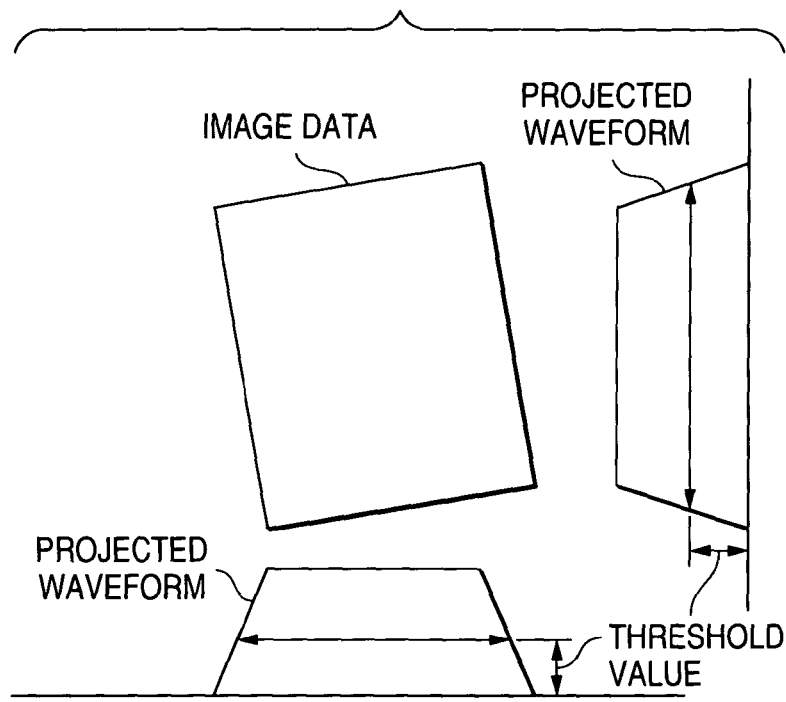
FIG. 7 is an explanatory diagram for explaining an example of an image skew correcting process operation executed in an input image skew correcting section.

The input image skew correcting section 53 is equipped with a function for detecting an skew of an image contained in the inputted print image data, and correcting the detected skew. FIG. 7 is an explanatory diagram of an example of an image skew correcting process operation executed by the input image skew correcting section 53. The skew correcting process of the image is performed as follows. For instance, while an input image is rotated, this input image is projected along both a vertical direction and a horizontal direction, as illustrated in FIG. 7. Then, an angle at which a range where a height of the projected waveform is not smaller than a predetermined threshold value becomes minimum is predicted as a skew angle. Then, the rotation of the input image may be corrected by this predicted skew angle.

The block size predicting section 54 predicts a block size into which the additional information has been embedded from the print image data whose skew has been corrected. There are some cases that a block size when the additional information has been embedded is processed by print inputting/outputting operations to be changed into another block size, and therefore, this block size predicting section 54 predicts the block size, which has been changed. The prediction of the block size may be carried out by utilizing such a feature that an embedded pattern owns edge components along predetermined directions (for instance, both vertical direction and horizontal direction). For instance, the block size predicting section 54 extracts edges from print image data whose skew has been corrected so as to form an edge-extracted image, and furthermore, forms such an image that edge components along the vertical direction and the horizontal direction have been derived from the edge-extracted image, and then, can predict a block size from a peak position of an autocorrelation function of this formed image. It should also be noted that a detailed process operation executed in the block size predicting section 54 will be explained later.

The block position detecting section 55 detects a block position where a pattern of additional information has been embedded from such a print image data which has been enlarged/reduced by an unknown magnification factor based upon the block size predicted by the block size predicting section 54. The block position detecting operation may be carried out by utilizing a cross-correlation between a mask image and the image into which the additional information has been embedded. This mask image is formed by extracting either positive polarity information or negative polarity information from any one of these two patterns. For example, the block position detecting section 55 produces such a mask image corresponding to the block size predicted by the block size predicting section 54, executes a correlation calculation between this mask image and the print image data whose skew has been corrected, extracts only such a point whose value becomes either a local maximum value or a local minimum value from an image of this correlation calculation result, projects these extracted points along both the vertical direction and the horizontal direction, and then, may detect the block position from this projected waveform and the block size predicted by the block size predicting section 54. The reason why the mask image may be formed from only one of these two patterns is given as follows: That is, the two patterns correspond to such patterns whose polarities are inverted. Also, in such a case that a mask image is formed from another pattern, a local maximum value and a local minimum value are simply inverted. It should be noted that a detailed process operation executed in the block position detecting section 55 will be explained later.

The additional information identifying section 56 is controlled by the additional information decoding section 57, and identifies such an additional information which is embedded in the block, both the position and the dimension of which are detected by both the block position detecting section 55 and the block size predicting section 54. The identifying process operation of the additional information may be carried out by utilizing a large/small relationship among summations of pixel values of four areas which are subdivided by edges along preselected directions. For example, while a detected block is subdivided into four areas along a lateral direction and a longitudinal direction, the summation value of all pixels, which are contained in each of four areas, is calculated. Then, additional information can be identified based on a large/small relationship among the four summation values. A detailed process operation executed in this additional information identifying section 56 will be described later.

The additional information decoding section 57 restores original additional information which has been embedded in a block in such a manner that this additional information decoding section 57 assembles the respective information with each other which has been identified by the above-described additional information identifying section 56 in accordance with a previously-defined format, and thereafter, decodes this assembled information. Also, a detailed process operation executed in this additional information decoding section 57 will be explained later.

The structural arrangement of the side for extracting the additional information according to the first embodiment of the present invention has been described. Next, a major portion of the above-explained structural arrangement will now be additionally explained.

Figure 8:
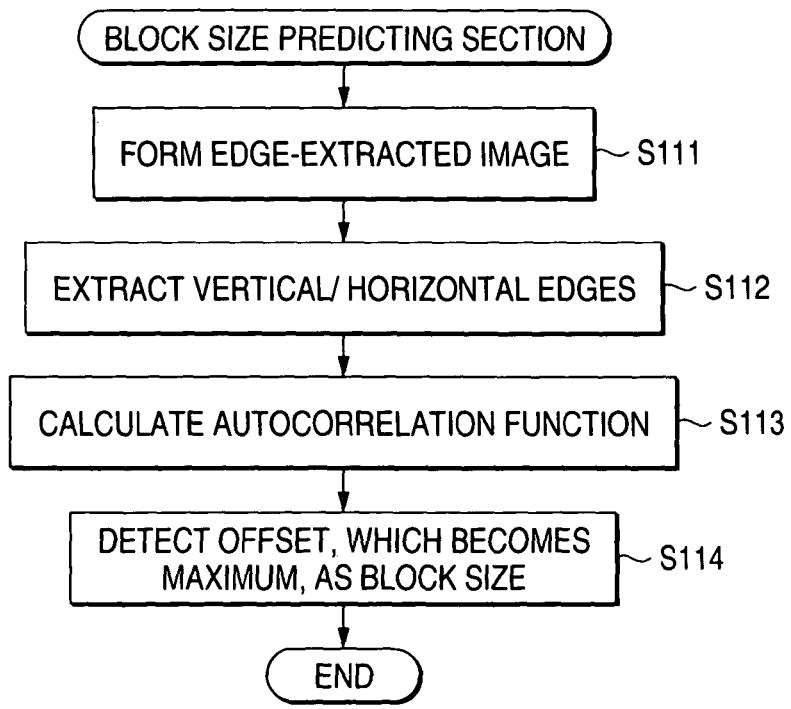
FIG. 8 is a flow chart for describing one example of operations of a block size predicting section 54.

FIG. 8 is a flow chart for describing an example of process operations executed by the block size predicting section 54. In a first step S111, a differential filter such as a Sobel type filter is applied to an input image, so that an edge-extracted image is obtained. Apparently, a Prewitt type filter, a Kirish type filter, and the like may be employed, namely an edge extracting method may be arbitrarily selected.

Figures 9, 10:
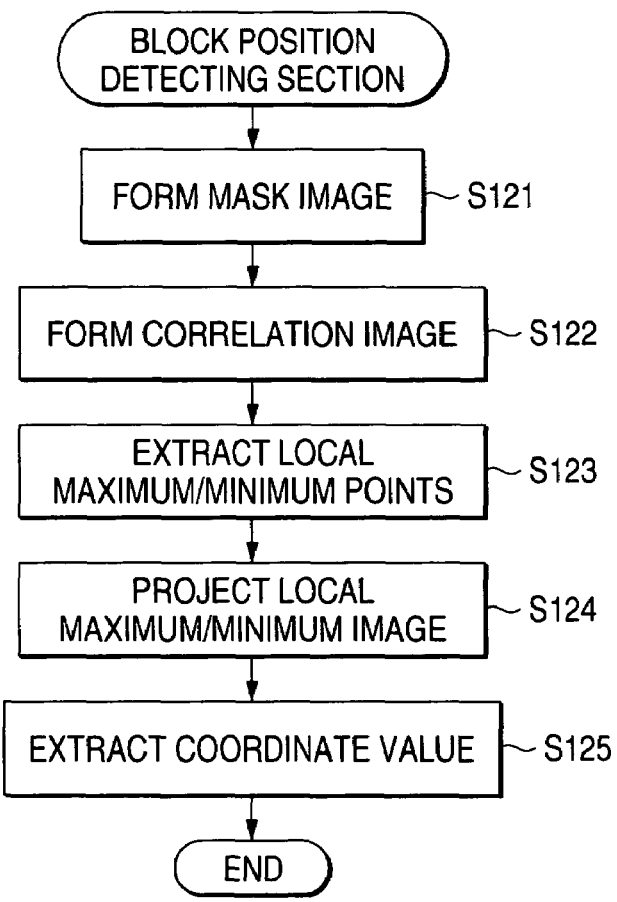
FIG. 9 is an explanatory diagram for explaining an example of a mask image used to extract edges along a horizontal direction and a vertical direction.
FIG. 10 is a flow chart for describing one example of operations of a block position detecting section 55.

Next, in a step S112, edge components along a predetermined direction, namely a horizontal direction and a vertical direction are further extracted from the edge-extracted image obtained in the previous step S111. FIG. 9 is an explanatory diagram of an example of a mask image used to extract the edges along the horizontal/vertical directions. As one of extraction methods for extracting the edge components along the horizontal/vertical directions from the edge-extracted image, for example, cross-correlation between the edge-extracted image and a mask having a cross shape shown in FIG. 9 may be calculated. As a result, such an edge image may be formed in which both edges of horizontal/vertical components and cross points thereof are especially emphasized. If a pattern of additional information corresponds to a pattern in which edges along the horizontal/vertical directions are present, a grid-shaped edge, which passes through a center of the rectangular shape (pattern size 31) shown in FIG. 3, is present in the formed image. The edge obtained from this pattern and the edges along the vertical/horizontal directions, which are present in the original image, are present in the edge image.

In a step S113, an autocorrelation function is acquired from the edge extracted image formed in the pervious step S112. Based upon this autocorrelation function, only the edge obtained from the pattern of the additional information is extracted. As an offset range of autocorrelation functions, which are acquired at this time, normally, it is sufficiently possible to calculate approximately (2, 2) to (20, 20). Within the edge image formed in the step S112, line segments along the lateral/longitudinal directions, which are arranged in a substantially equi-interval, have been extracted. Therefore, if such an offset where the autocorrelation function becomes maximum is detected, it is conceivable that this detected offset is made coincident with a block size after being enlarged/reduced. As a consequence, in a step S114, such an offset that the autocorrelation function becomes maximum may be predicted as the block size. It should be understood that the reason why (0, 0), (0, 1), (1, 0), and (1, 1) are excluded from the calculation as the offset is given as follows: That is, as a nature of autocorrelation of an image, such a nature exists that autocorrelation values at these offsets are increased. Furthermore, normally speaking, there is no possibility that such small values cannot be realized as a block size.

As a consequence, even if the pattern size when the additional information is embedded is not known, and the resolution when the image data is outputted is not known, and also the resolution when the image data is inputted is not known, the block size information used to decode the additional information from the print image data can be obtained. A care should be taken to such a fact that the value of the block size obtained in this case is equal to an integer value. In combinations between printers and scanners, since resolution to be used is normally combinations of such resolution as 400 dpi, 600 dpi, and 1200 dpi, there are many cases that corresponding block sizes of embedding images whose resolution has been converted are integers. However, since resolution of input images when the images are inputted by digital cameras depend upon distances between the digital cameras and print images corresponding to photographic objects, corresponding block sizes of print image data whose resolution has been converted are not always equal to integers. As a result, it is possible to be regarded that block sizes calculated by the block size predicting section 54 are approximate values. However, since the block size calculated in this stage is corrected by the block position detecting section 55 (will be explained later), there is no problem even when this calculated block size is an approximate value.

Figures 11, 12:
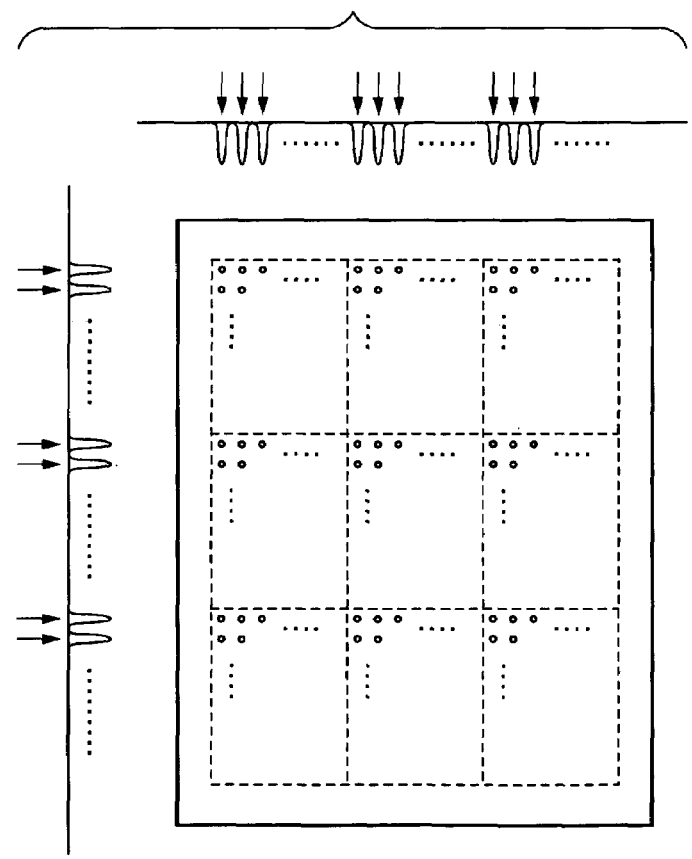
FIG. 11 is an explanatory diagram for explaining an example of a mask image used in the block position detecting section 55.
FIG. 12 is an explanatory diagram for explaining one example of a local maximum/minimum image formed by the block position detecting section 55, and an example of process operations for acquiring a block position from the local maximum/minimum image.

Next, the operations of the block position detecting section 55 will now be explained in detail. FIG. 10 is a flow chart for describing an example of operations executed in the block position detecting section 55. First, in a step S121, the block position detecting section 55 forms a mask image based upon the block size predicted by the block size predicting section 54. FIG. 11 is an explanatory diagram for explaining an example of the mask image employed in the block position detecting section 55. As the mask image formed in the step S121, such a mask image as shown in FIG. 11(A) may be formed when the block size is equal to, for instance, an even number, whereas such a mask image as indicated in FIG. 11(B) may be formed when the block size is equal to, for example, an odd number. As to a feature of these mask images, when the mask is subdivided into four areas by a vertical axis and a horizontal axis, both an upper right area and a lower left area are set to all "+1", whereas both a lower right area and an upper left area are set to all "−1." This is equivalent to such an area that only either positive polarity information or negative polarity information is extracted from any one of two embedding patterns. It should be understood that when the block size is the odd number, a portion which is overlapped with the vertical/horizontal axes is set to "0." This mask image corresponds to the pattern of the additional image shown in FIG. 2.

Next, in a step S122, a cross-correlation is calculated between the mask image formed in the previous step S121 and the print image data so as to form a correlation image. In this case, as apparent form such a comparison made between the pattern of the additional image shown in FIG. 2 and the pattern of the mask image indicated in FIG. 11, this correlation value may easily become a local maximum value at the time when the block into which the additional information "1" is embedded is just overlapped with the mask. Conversely, this correlation value may easily become a local minimum value at the time when the block into which the additional information "0" is embedded is just overlapped with the mask. This trend may be particularly emphased when the original image is flat which corresponds to the position of the block before the additional information is embedded. Conversely, in such a case that the original image owns a local edge, which corresponds to the position of the block before the additional information is embedded, the correlation value is not always equal to either the local maximum value or the local minimum value when the block into which the additional information is embedded is just overlapped with the mask. However, since this adverse influence may be reduced by a projection method (will be explained later), if the original image is not such an image which has extremely large numbers of edges, then this never causes any problem.

In a step S123, the block position detecting section 55 derives only such a point which owns either a local maximum value or a local minimum value from the correlation image formed in the step S122. First, a method of extracting the local maximum point will now be explained. To extract the local maximum point, while a correlation image is sequentially scanned in the raster scanning order, pixel values within a window having 3×3 are compared with each other and marks are applied to all of pixel positions other than a pixel position indicative of a maximum value. The marks indicate that the marked pixel positions do not constitute a subject pixel position of the local maximum value. Furthermore, when a pixel position representative of the maximum value has already been marked, since this pixel position similarly does not constitute the local maximum value, the mark is applied to this pixel position. This marking work is carried out from an upper left portion to a lower right position of the correlation image. As a result, since the pixel positions, which are not marked, may constitute the position indicative of the local maximum value, all of the pixel values of the positions to which the marks are applied are set to "0". Thereby, only the position where the local maximum value is present, and the local maximum value thereof are extracted. Also, to extract the local minimum value, the correlation image is firstly inverted, and thereafter, when a similar operation to that of extracting the local maximum value is carried out, only a position where a local minimum value is present, and the local minimum value thereof are extracted. Then, if a local maximum value image is added to a local minimum value image, a local maximum/minimum image may be obtained. FIG. 12 is an explanatory diagram of an example of the local maximum/minimum image formed by the block image detecting section 55, and also, an example of a process operation for acquiring the block position from the local maximum/minimum image. Both the local maximum values and the local minimum values are indicated by white circles in FIG. 12, which are acquired in the above-described process operation. Both the local maximum values and the local minimum values may be detected at a substantially center position of each of the patterns.

In a step S124, the local maximum/minimum image obtained in the previous step S123 is projected along the vertical direction and the horizontal direction. Since the respective blocks are arranged along the lateral direction and the longitudinal direction, as represented in FIG. 12, projection waveforms are obtained which own peaks in a nearly constant interval along both the vertical direction and the horizontal direction.

Next, in a step S125, the block position detecting section 55 predicts a correct block position based upon the peak positions of the respective projection waveforms along the vertical direction and the horizontal direction, which are acquired in the step S124. Concretely speaking, a peak position located at a first end is firstly acquired, and since a next peak position is sequentially searched from this first peak position within a range of the block size ±δ, which is obtained by the block size predicting section 54, a combination between the peak position along the vertical direction and the peak position along the horizontal direction may be employed as each of the block positions. In FIG. 12, the peak positions are indicated by arrow lines, and combinations of these peak positions constitute the respective positions. In this case, if the block size is smaller than, or equal to 8, then the value of "δ" is selected to be on the order of 1. If the block size is larger than 8, then the value of "δ" is selected to be on the order of 2.

As previously explained in the operation of the step S121, in such a case that the original image locally owns the strong edges, there are some possibilities that either the position of the local maximum point or the position of the local minimum point, which are obtained from the blocks containing this original image, is shifted from the positional interval of the local maximum/minimum points which are acquired from the flat portion. However, this fluctuation may be largely reduced by employing the above-explained projection method, and by seeking the peak positions in a substantially constant interval.

Next, operations performed in the additional information identifying section 56 will now be explained in detail. The additional information identifying section 56 is controlled by the additional information decoding section 57, and identifies the additional information embedded in the block based upon the block positional information detected by the block position detecting section 55, and the block size information predicted by the block size predicting section 54.

Figure 13:
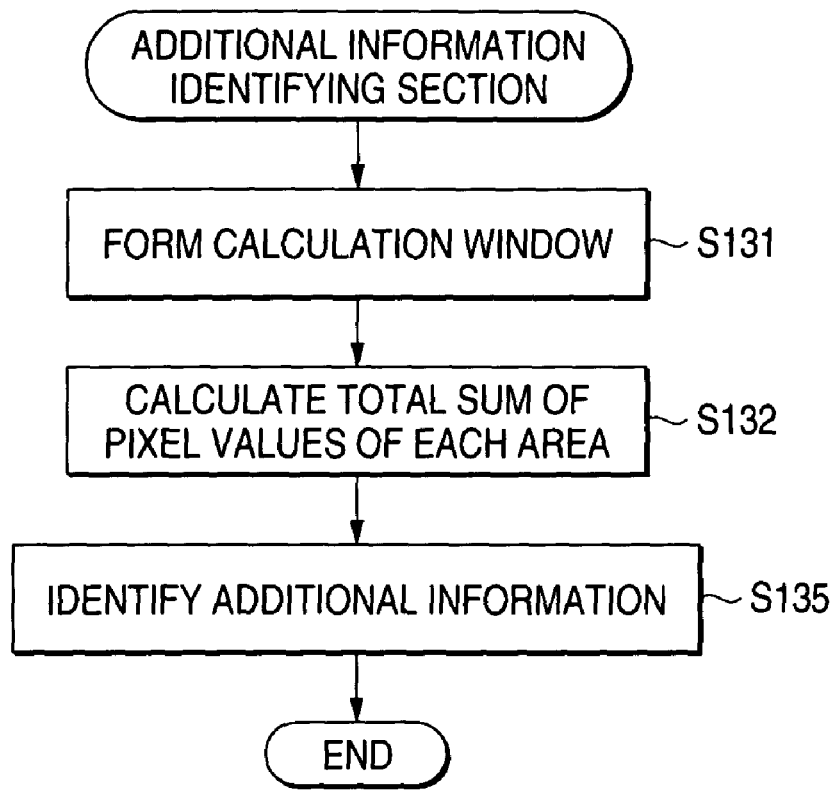
FIG. 13 is a flow chart for explaining an example of operations of an additional information identifying section 56.
Figure 14:
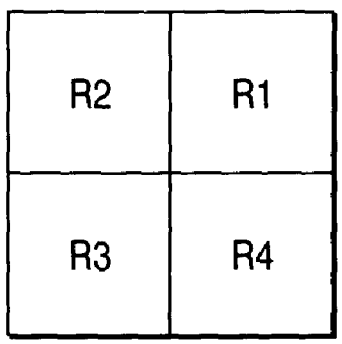
FIG. 14 is an explanatory diagram for explaining an example of a calculation window employed in the additional information identifying section 56.
Figure 14:
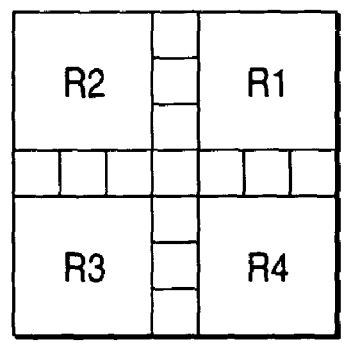

FIG. 13 is a flow chart of an example of the operations of the additional information identifying section 56. First, in a step S131, the additional information identifying section 56 sets a calculation window in which a block is subdivided into four areas along the lateral/longitudinal directions based upon the block size information. FIG. 14 is an explanatory diagram of one example of the calculation window employed in the additional information identifying section

56. The size of this calculation window is made equal to the block size predicted by the block size predicting section 54. As shown in FIG. 14, the calculation window is subdivided into four areas by a vertical axis and a horizontal axis. It should be understood that as shown in FIG. 14(B), when the block size is the odd number, such a portion, which is overlapped with the vertical axis and the horizontal axis, is not involved in the areas. An upper right area will be referred to as "R1"; an upper left area will be referred to as "R2"; a lower left area will be referred to as "R3"; and a lower right area will be referred to as "R4."

Next, in a step S132, the calculation window formed in the step S131 is applied with respect to the block detected by the block position detecting section 55 so as to calculate a total value of pixel values contained in each of the four areas. A total value of pixel values within the area "R1" will be also called as "R1" unless this pixel value summation is confused as the area name. This idea may be similarly applied to the remaining areas R2, R3, and R4.

In a step S133, the additional information identifying section 56 judges as to whether additional information which is embedded into a relevant block is "1", or "0", or cannot judge as to whether the additional information which is embedded into the relevant block is "1", or "0" based upon a large/small relationship among the total pixel values R1, R2, R3, and R4. This judging operation is carried out as follows:

(1). If [(R1>R2) & (R1>R4) & (R3>R2) & (R3>R4)], then the additional information="1."

(2). When the judgement result is not the item (1) if [(R2>R1) & (R2>R3) & (R4>R1) & (R4>R3)], then the additional information="0."

(3). When the judgement result is not the item (2) if [(R1×R4) & (R4>R3) & (R3>R2)], then the additional information="1."

(4). When the judgement result is not the item (3) if [(R4>R1) & (R1>R2) & (R2>R3)], then the additional information="0."

(5). When the judgement result is not the item (4) if [(R3×R4) & (R4>R1) & (R1>R2)], then the additional information="1."

(6). When the judgement result is not the item (5) if [(R4>R3) & (R3>R2) & (R2>R1)], then the additional information="0."

(7). When the judgement result is not the item (6) if [(R3×R2) & (R2>R1) & (R1>R4)], then the additional information="1."

(8). When the judgement result is not the item (7) if [(R2>R3) & (R3>R4) & (R4>R1)], then the additional information="0."

(9). When the judgement result is not the item (8) if [(R1×R2) & (R2>R3) & (R3>R4)], then the additional information="1."

(10). When the judgement result is not the item (9) if [(R2>R1) & (R1>R4) & (R4>R3)], then the additional information="0."

(11). When the judgement result is not the item (10) the additional information cannot be judged.

Figure 15:
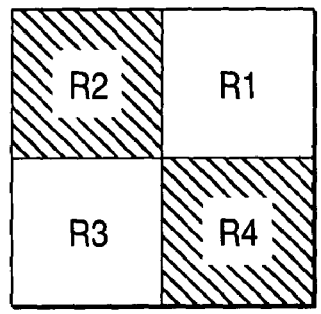
FIG. 15 is an explanatory diagram for explaining an example of an identifying process operation of the additional information executed in the additional information identifying section 56.
Figure 15:
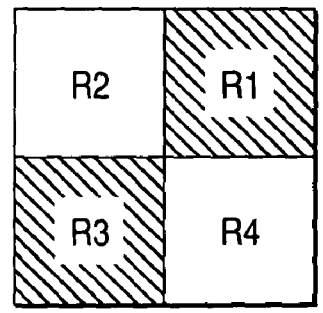
Figure 15:
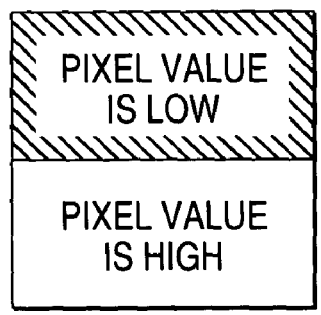
Figure 15:
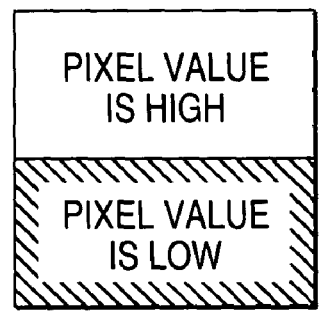
Figure 15:
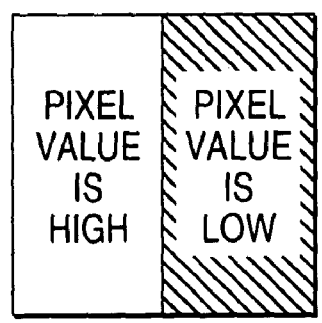
Figure 15:
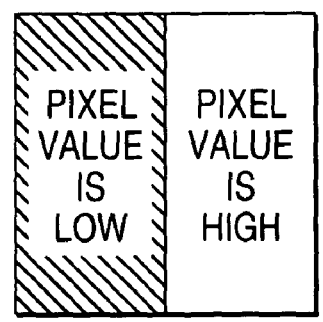

FIG. 15 is an explanatory diagram for explaining one example of the identifying process operation of the additional information executed in the additional information identifying section 56. In this drawing, areas having smaller pixel values are indicated by hatching lines. While the above-described identifying process operation of the additional information is carried out, if the original block is flat, then the pixel values of the R1-area and the R3-area are increased, and the pixel values of the R2-area and the R4-area are decreased in such a case that the additional information of "1" is embedded into the original block (see FIG. 15A). As a result, even after the image input has been performed by the printing operation and either the scanner or the digital camera, it may be interpreted that such a probability is high where the relationship of [(R1>R2) & (R1×R4) & (R3>R2) & (R3>R4)] is established. Conversely, the pixel values of the R2-area and the R4-area are increased, and the pixel values of the R1-area and the R3-area are decreased in such a case that the additional information of "0" is embedded into the original block (see FIG. 15B). As a result, it may be interpreted that such a probability is high where the relationship of [(R2>R1) & (R2×R3) & (R4>R1) & (R4>R3)] is established.

However, there many cases that additional information cannot be identified by such a simple interpretation in a block containing an edge portion of an image. As a consequence, in this example, while the following two cases are considered, prediction precision of additional information is increased, namely, in the case that a stepped edge is present in an original image along the horizontal direction, and also, another stepped edge is present along the vertical direction.

Concretely speaking, in such a case that a block of an original image, to which additional information is intended to be embedded, owns such a stepped edge as shown in FIG. 15(C), even after additional information of "1" has been embedded and also the information-embedded block has been printed/inputted, the following probability may be conceived in this block. That is, if the stepped edge is small, then such a probability is high at which [(R1>R2) & (R1>R4) & (R3>R2) & (R3>R4)] can be established, whereas if the stepped edge is large, then such a probability is high at which [(R3>R4) & (R4>R1) & (R1>R2)] can be established in this block. Similarly, the condition setting operations are carried out by considering as to other cases that such stepped edges as shown in FIG. 15(D), FIG. 15(E), and FIG. 15(F) are present.

Moreover, since the comparisons are made among the total values in the respective areas in the above-described process operations, there is no problem even when boundary lines of the stepped edges of the original images are not located at the centers of the blocks in FIG. 15(C), FIG. 15(D), FIG. 15(E), and FIG. 15(F). Also, even when the step edges are slightly inclined, there is a high possibility that the additional information can be correctly identified. Conversely, when a large edge is present only in one of the four areas, additional information can be hardly identified. In such a case, for example, such a value of "reject" may be set as the identification values other than "1", or "0." Alternatively, additional information is forcibly judged as either "1" or "0", and then, may be decoded based upon an error correction code. In this example, since the latter-mentioned error correction is utilized, the additional information is identified as "0" when the correct identification cannot be carried out.

Figure 16:
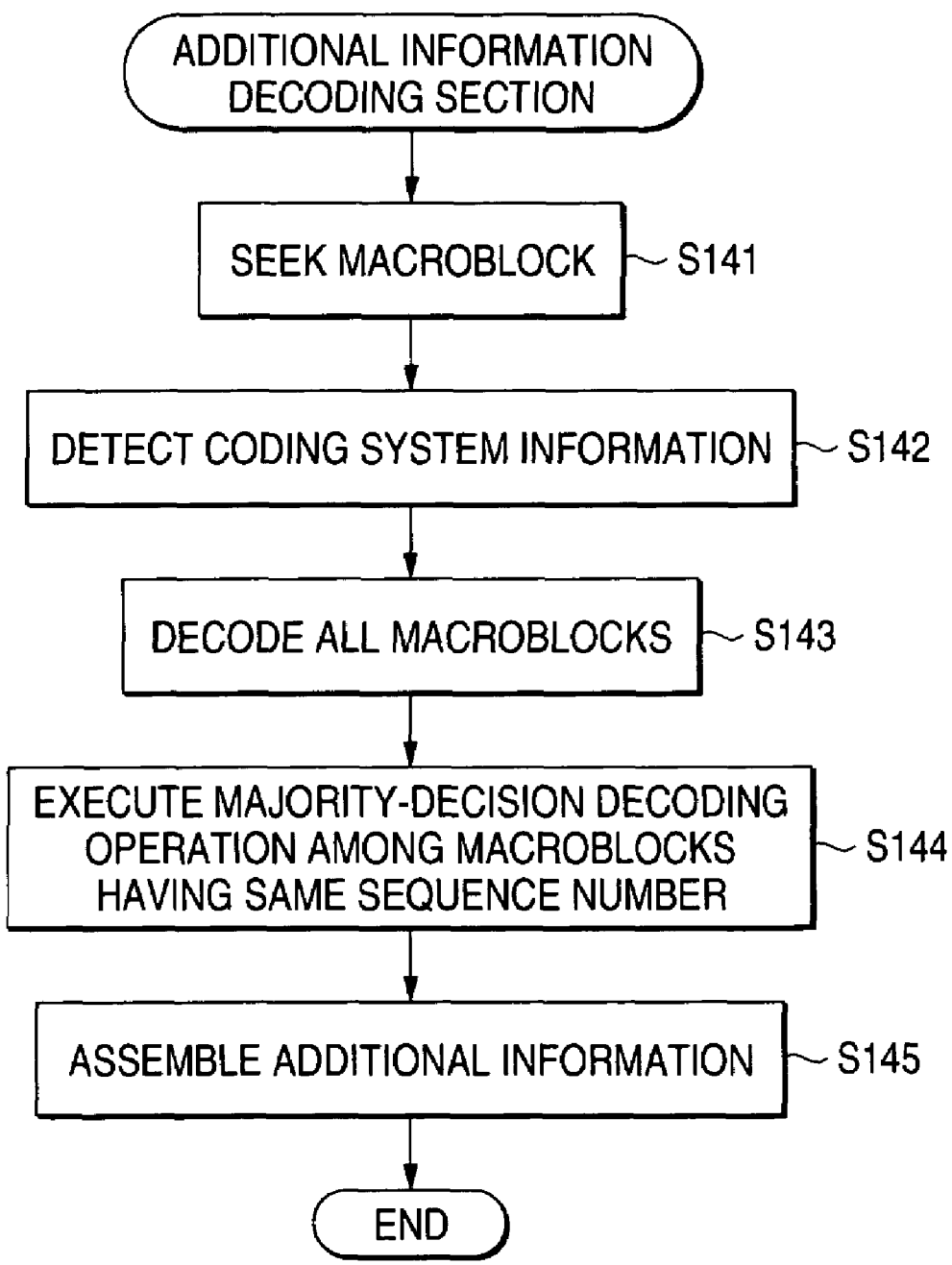
FIG. 16 is a flow chart for explaining an example of operations of an additional information decoding section 57.

Next, detailed operations executed in the additional information decoding section 57 will now be explained. FIG. 16 is a flow chart for explaining an example of the process operations of the additional information decoding section 57. First, in a step S141 of this flow chart, the additional information decoding section 57 seeks a macroblock. Concretely speaking, while this additional information decoding section 57 controls the additional information identifying section 56 so as to identify the block position detected by the block position detecting section 55 from the upper left direction, the additional information decoding section 57 detects such a place which is coincident with a head maker (for instance, "11111"). Since the additional information decoding section 57 knows such a fact that a size of a macroblock is defined by Y rows and X columns (for example, 16 rows and 8 columns), if the head marker (for instance, "11111") is located at a point which is separated from this place by 8 blocks along the right direction, or if the head marker (for example, "11111") is located at a point which is separated from this place by 16 blocks along the lower direction, then the additional information decoding section 57 defines a position of a first macroblock. If the position of the first macroblock can be defined, then positions of other macroblocks may be defined by utilizing such a nature that the macroblocks are correctly arranged in a regular manner. Apparently, even when a head marker contains an error, positions of macroblocks may be specified unless most of head markers are erroneously made.

Next, a coding system is detected in a step S142. This coding system may be detected by such a way that coding system information of all of these macroblocks is read out, and is decoded by way of a majority decision.

In a step S143, the additional information decoding section 57 decodes the information of all of the macroblocks in accordance with the logic format known in this field. Then, in a step S155, the additional information decoding section 57 decodes such information of the macroblocks having the same sequence numbers among the decoded information of these macroblocks by employing the majority decision. Also, in a step S145, in the case that there are sequence numbers other than "1", the additional information decoding section 57 connects the additional information to each other in the order of these sequence numbers so as to be assembled.

With execution of the above-described operations, the additional information decoding section 57 can decode the additional information embedded in the image. At this time, the additional information decoding section 57 can firmly acquire the additional information in such a manner that the error correction coding operation is carried out, and the additional information is repeatedly embedded with a plurality of macroblocks, and then, the decoding operation is performed by way of the majority decision, while the adverse influence of the original image may be suppressed as the minimum value. Also, as to such an image into which the patterns having the above-described features have been embedded, for instance, even in the case that the adverse influences are caused by the printing apparatus and the reading apparatus, and also the enlarging/reducing conversion process operations have been performed in a half way, the additional information can be firmly extracted.

Second Embodiment

Figure 17:
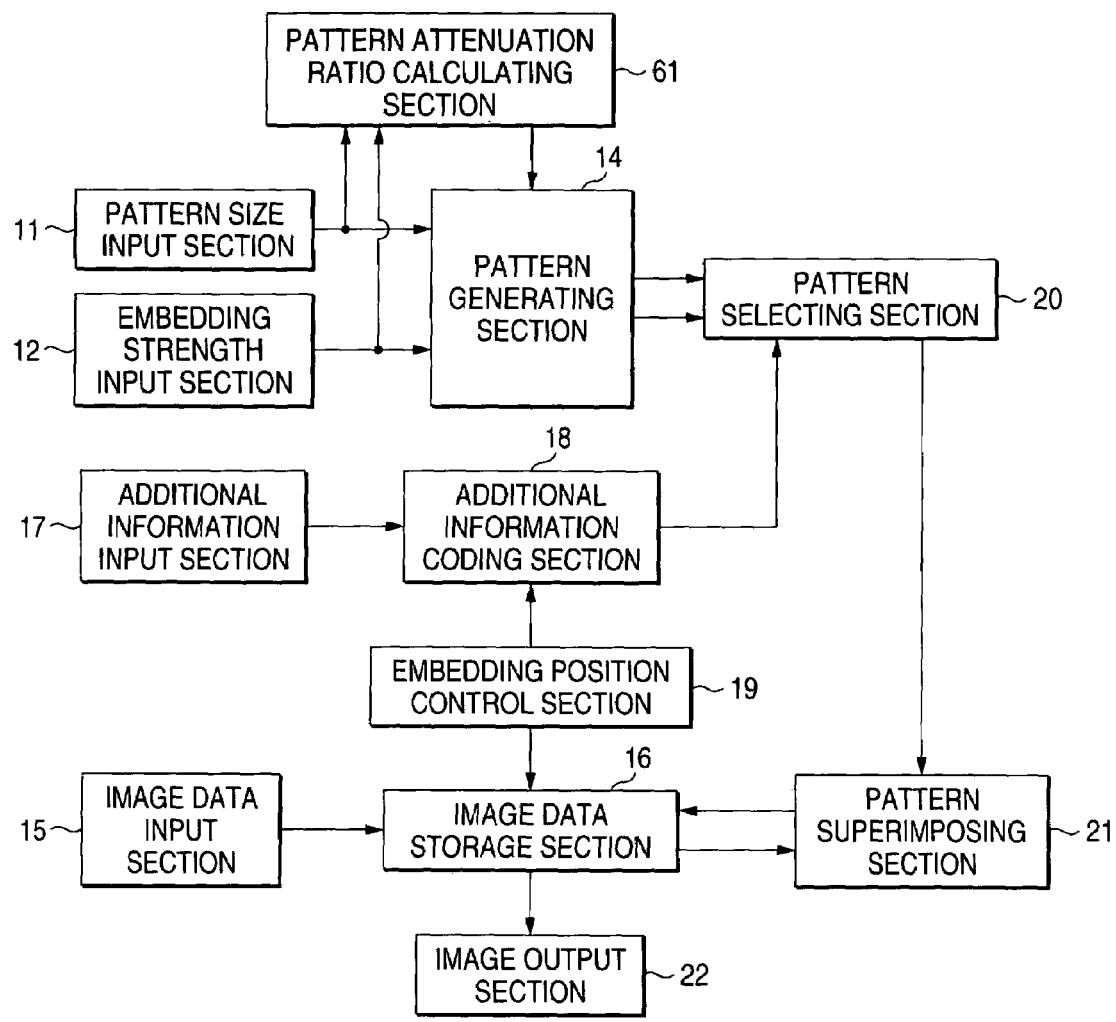
FIG. 17 is a block diagram for indicating one structural example of an additional information embedding side according to a second embodiment of the present invention.

Next, a description will now be given on a second embodiment of the present invention. FIG. 17 is a block diagram for indicating one structural example of an additional information embedding side according to the second embodiment. It should be noted that the same reference numerals shown in FIG. 1 will be employed as those for denoting the same, or similar structural elements of FIG. 17, and explanations thereof may be omitted. Reference numeral 61 indicates a pattern attenuation ratio calculating section. In this second embodiment, while this pattern attenuation ratio calculating section 61 is provided instead of the pattern attenuation ratio input section 13, a pattern attenuation ratio is acquired by way of a calculation.

The pattern size input section 11 selects an image output device to which a user has previously been registered via either a personal computer or an operation panel, which are not shown. Since this output device is selected, the pattern size input section 11 inputs/sets an optimum pattern size to this selected output device. Apparently, a pattern size may be alternatively inputted/set by using numeral values and the like. Also, an embedding strength input section 12 inputs/sets such a value designated by the user via the personal computer, or the operation panel, which are not shown. It should be understood that when a pre-defined fixed value is employed, any one, or both of these pattern size input section 11/embedding strength input section 12 may not be provided.

The pattern attenuation ratio calculating section 61 calculates an optimum pattern attenuation ratio based upon the values inputted/set by both the pattern size input section 11 and the embedding strength input section 12 (otherwise, pre-defined fixed values). It should also be noted that detailed operations of this pattern attenuation ratio calculating section 61 will be discussed later.

Other structural units of this second embodiment are similar to those of the above-described first embodiment. These structural units will now be summarized as follows: The pattern generating section 14 forms two patterns based upon the pattern size, the embedding strength, and the pattern attenuation ratio, which have been inputted/set. It should also be noted that two patterns to be formed own similar features to those of the above-described first embodiment. The image data input section 15 inputs image data. The image data storage section 16 is used so as to record input image data, to temporarily hold work data during process operation, and to hold output data. The additional information input section 17 inputs additional information which is embedded into input image data from a personal computer, and software, which are not shown. The additional information to be embedded into the input image data may be realized by a character string, a numeral, or image data, which are instructed by the user. The additional information coding section 18 converts the additional information inputted by the additional information input section 17 into a predetermined coding format, and then, forms embedding information which is actually embedded into image data. The embedding position control section 19 designates such a position that the embedding information is embedded into the image data stored in the image data storage section 16 in accordance with a predetermined embedding format. The pattern selecting section 20 selects any one of the two patterns formed by the pattern generating section 14 based upon the embedding information formed by the additional information coding section 18. The pattern superimposing section 21 adds such a pattern selected by the pattern selecting section 20 with respect to such an image block, while this image block is located at an address of the image data storage section 16, which is designated by the embedding position control section 19. It should also be understood that when a summation value exceeds a maximum value (for instance, 255), this addition value is set to the maximum value (255), whereas when a summation value becomes a minus value, this summation value is set to zero. The image output section 22 outputs such an image into which the additional information has been embedded with respect to an image output device such as a printer.

Next, a detailed description will now be made of the operations of the pattern attenuation ratio calculating section 61, which constitute the feature of this second embodiment. The pattern attenuation ratio calculating section 61 calculates such an attenuation ratio by which degradation of image qualities caused by embedding the additional information may be suppressed to a minimum value, based upon both the block size and the embedding strength, which are inputted. Concretely speaking, the pattern attenuation ratio calculating section 61 calculates such an attenuation ratio in such a manner that boundaries between adjoining blocks are connected to each other in a smooth manner.

Figure 18:
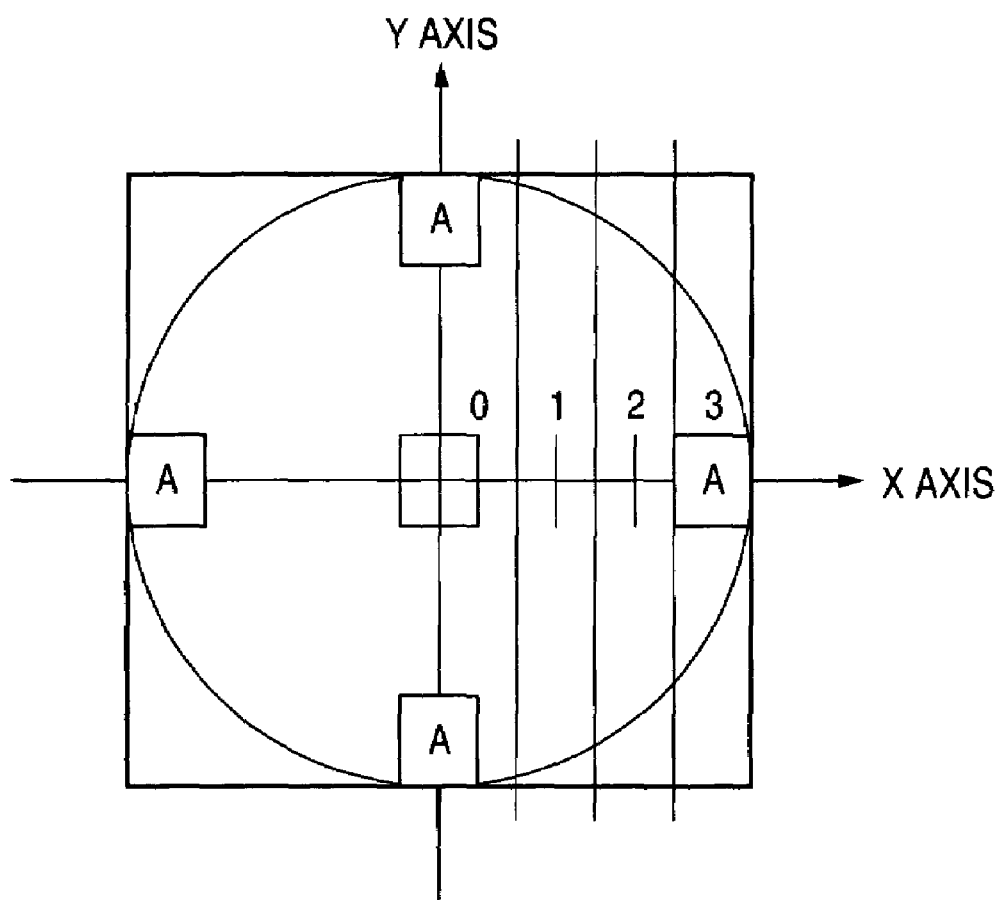
FIG. 18 is an explanatory diagram for explaining one example of operations executed in a pattern attenuation ratio calculating section 61.

FIG. 18 is an explanatory diagram for explaining an example of the operations of the pattern attenuation ratio calculating section 61. As a concrete calculation method of the pattern attenuation ratio executed in the pattern attenuation calculating section 61, in such a case that either an exponential function of a formula (1) or an exponential function of another formula (2) in FIG. 18 is employed, absolute values of points "A" in this drawing may become sufficiently small. When a printing operation is performed, this value may be satisfactorily equal to approximately "10." The example shown in FIG. 18 corresponds to a pattern size of 8×8. Assuming now that a coordinate system indicated in this drawing is employed, a distance of the point "A" from an origin becomes 3. In general, when a pattern size is defined by "N×M", while a smaller value between N and M is used, "α" may be calculated based upon the below-mentioned formula:

$C \cdot \exp(-\alpha(\min(N, M)/2-1)) < 10$, if the formula (1) is employed.

Also, "α" may be calculated based upon the below-described formula:

$C \cdot \exp(-\alpha(\min(N, M)/2-1)^2) < 10$, if the formula (2) is employed.

As described above, when the pattern attenuation ratio is not inputted, the pattern attenuation ratio can be automatically calculated from the pattern size and/or the embedding strength. Of course, this calculation method is merely one example. Alternatively, the pattern attenuation ratio may be fitted to the point "A" in FIG. 18, or may be fitted to points at four corners. Also, in this case, as the pattern attenuation ratio, the same values are employed along the lateral direction and the longitudinal direction. Alternatively, a pattern attenuation ratio along the longitudinal direction and a pattern attenuation ratio along the lateral direction may be separately calculated so that the pattern generating section 14 may generate the pattern by using those pattern attenuation ratios. When values to be set as the pattern size and the embedding strength are limited at a certain degree, pattern attenuation ratios may be calculated and registered in advance so that a proper pattern attenuation ratio may be selected and employed at a time this pattern attenuation ratio is employed.

A structure of an additional information extracting device side provided in the image processing apparatus according to the second embodiment of the present invention is similar to that of the above-described first embodiment. As a consequence, explanations of this additional information extracting device structure are omitted.

Third Embodiment

Figure 19:
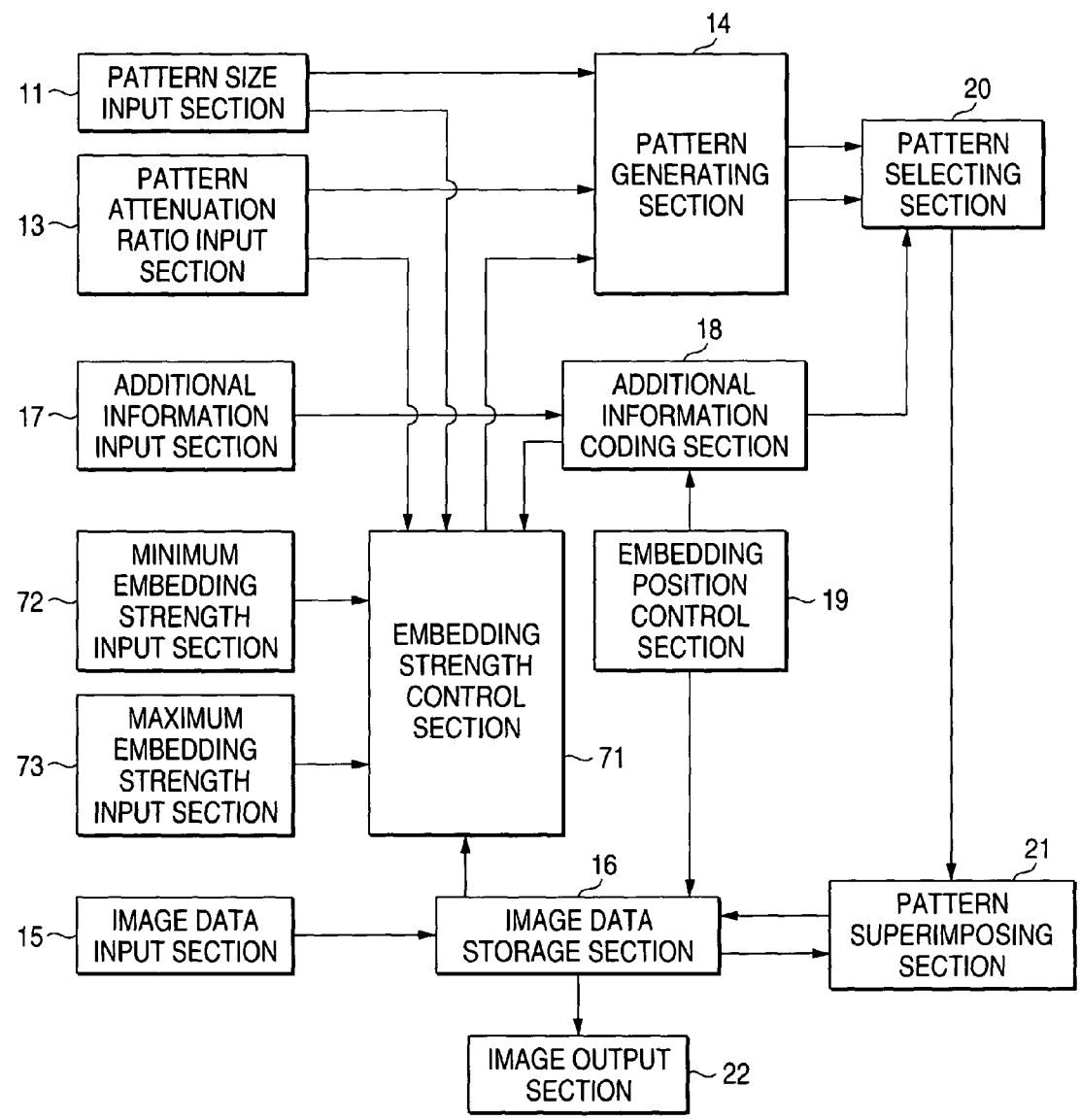
FIG. 19 is a block diagram for indicating one structural example of an additional information embedding side according to a third embodiment of the present invention.

Next, a description will now be given on a third embodiment of the present invention. FIG. 19 is a block diagram for indicating one structural example of an additional information embedding side according to the third embodiment. It should be noted that the same reference numerals shown in FIG. 1 will be employed as those for denoting the same, or similar structural elements of FIG. 19, and explanations thereof may be omitted. Reference numeral 71 indicates an embedding strength control section; reference numeral 72 shows a minimum embedding strength input section, and reference numeral 73 represents a maximum embedding strength input section. In the above-described respective embodiments, the pattern is embedded at a constant embedding strength irrespective of the inputted image data. As a result, the patterns are embedded at the same strengths even in the flat portion where the embedded pattern can be easily identified, and also even in such a place where the strong edge is present and the embedded pattern can be hardly identified. As a consequence, there are some cases that the identification performance is reduced in the portion where the strong edge is present, whereas although the identification performance is high, the image quality is degraded in the flat portion. In this third embodiment, the image processing apparatus is arranged in such a manner that since an embedding strength is controlled in response to image data of such an area into which a pattern is embedded, an identifying characteristic within an area where the embedded pattern can be hardly identified is improved, and also degradation of image qualities in a flat area are reduced.

In this third embedded mode, the embedding strength control section 71, the minimum embedding strength input section 72, and the maximum embedding strength input section 73 are employed instead of the pattern strength input section 12 provided in the above-described first embodiment. The pattern size input section 11 selects an image output device to which a user has previously been registered via either a personal computer or an operation panel, which are not shown. Since this output device is selected, the pattern size input section 11 inputs/sets an optimum pattern size to this selected output device. Apparently, a pattern size may be alternatively inputted/set by using numeral values and the like.

The embedding strength control section 71 calculates an optimum embedding strength of a pattern based on values (or fixed values) inputted and set by the pattern size input section 11 and the pattern attenuation ratio input section 13; a signal, which is inputted by the additional information input section 17 and is coded by the additional information coding section 18; a value of image data (block) of an area having the same size as that of a superimposed pattern addressed by the embedding position control section 19, which is stored in the image data storage section 16; a minimum embedding strength inputted by the minimum embedding strength input section 72, and a maximum embedding strength inputted by the maximum embedding strength input section 73. It should be noted that detailed operations of the embedding strength control section 71 will be explained later.

The minimum embedding strength input section 72 may set such a minimum embedding strength by which a pattern can be identified. Also, the maximum embedding strength input section 73 may set such a maximum embedding strength by which degradation of image qualities caused by embedding a pattern do not become conspicuous. It should also be noted that both the minimum embedding strength and the maximum embedding strength may be alternatively set as pre-defined fixed values, or may not be set.

Other structural units of this third embodiment are similar to those of the above-explained first embodiment. These structural units will now be summarized as follows: The pattern generating section 14 forms two patterns based upon an inputted/set pattern size, and an embedding strength calculated by the embedding strength control section 71. The two patterns own similar features to those of the above-described first embodiment. The image input section 15 inputs thereinto image data. The image data storage section 16 is used so as to record input image data, to temporarily hold work data during process operation, and to hold output data. The additional information input section 17 inputs additional information which is embedded into input image data from a personal computer and software, which are not shown. The additional information to be embedded into the input image data may be realized by a character string, a numeral, or image data. The additional information coding section 18 converts the additional information inputted by the additional information input section 17 into a format, and then, forms embedding information which is actually embedded into image data. The embedding position control section 19 designates such a position that the embedding information is embedded into the image data stored in the image data storage section 16 in accordance with a predetermined embedding format. The pattern selecting section 20 selects any one of the two patterns formed by the pattern generating section 14 based upon the embedding information formed by the additional information coding section 18. The pattern superimposing section 21 adds such a pattern selected by the pattern selecting section 20 with respect to such an image data, while this image data is located at an address of the image data storage section 16, which is designated by the embedding position control section 19. It should also be understood that when a summation value exceeds a maximum value (for instance, 255), this addition value is set to the maximum value (255), whereas when a summation value becomes a minus value, this summation value is set to zero. The image output section 22 outputs such an image into which the additional information has been embedded with respect to an image output device such as a printer.

Next, the embedding strength control section 71 will now be described in detail, which constitute a feature of this third embodiment. The embedding strength control section 71 calculates an optimum embedding strength of a pattern based on values (or fixed values) inputted and set by the pattern size input section 11 and the pattern attenuation ratio input section 13; a signal, which is inputted by the additional information input section 17 and is coded by the additional information coding section 18; a value of image data of an area having the same size as that of a superimposed pattern addressed by the embedding position control section 19, which is stored in the image data storage section 16; a minimum embedding strength inputted by the minimum embedding strength input section 72, and a maximum embedding strength inputted by the maximum embedding strength input section 73.

Figure 20:
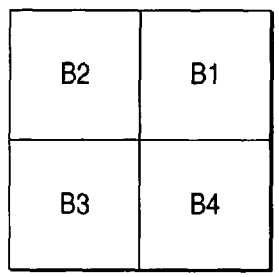
FIG. 20 is an explanatory diagram for explaining an example of 4-subdivided partial blocks which are employed in such a case that an embedding strength is calculated in an embedding strength control section.

FIG. 20 is an explanatory diagram of an example of 4-divided partial blocks, which are employed when an embedding strength is calculated in the embedding strength control section 71. In the embedding strength control section 71, while image data of an area on which a pattern is superimposed is set as a block, this block (image data) is subdivided into four sets of partial blocks by two edges, which pass through a center of this block in correspondence with the pattern. For instance, when the edges of the pattern pass through the center thereof and are present along both a vertical direction and a horizontal direction, the block is subdivided by ¼ by way of both a vertical straight line and a horizontal straight line, which corresponds to the edges of the pattern. That is, the block is divided into four subdivided blocks as shown in FIG. 20.

Subsequently, a summation of pixel values is calculated with respect to each of the four subdivided blocks, and then, an embedding strength is determined based upon four sets of the calculated summation values and the superimposing pattern. In FIG. 20, summations of pixel values after the pattern has been superimposed in the respective partial blocks will be referred to as B1, B2, B3, and B4. When the superimposing pattern corresponds to "1", such a minimum embedding strength is calculated as an optimum embedding strength, at which the summations B1, B2, B3, B4 of the pixel values of the four areas after the pattern has been superimposed can satisfy the below-mentioned relationship:

min (B1, B3)>max (B2, B4).

Also, when the superimposing pattern corresponds to "0", such a minimum embedding strength is calculated as an optimum embedding strength, at which the summations B1, B2, B3, B4 of the pixel values as to the four areas after the pattern has been superimposed can satisfy the below-mentioned relationship:

min (B2, B4)>max (B1, B3).

It should also be noted that when the calculated embedding strength is smaller than the value inputted from the minimum embedding strength input section 72, the embedding strength is set as the minimum embedding strength inputted from the minimum embedding strength input section 72. Further, when the calculated embedding strength is larger than the value inputted from the maximum embedding strength input section 73, the embedding strength is set as the maximum embedding strength inputted from the maximum embedding strength input section 73.

An electronic image to which the pattern produced by employing the minimum embedding strength capable of satisfying the above-described relationship has been superimposed can be identified by 100% in the additional information detecting structure explained in the first embodiment of the present invention unless this electronic image receives any image converting operation. However, in such a case that this electronic image is printed, this printed image is inputted by using such an image input device as a scanner, or a digital camera, and then this inputted image is again returned to electronic information, this electronic information is treated by a large number of image processing operations in the printing stage and the input stage. In particular, in such a case that the calculated value becomes excessively small, the embedded information can be hardly identified. Conversely, in the case that the calculated value becomes excessively large, the embedded information can be easily identified, but an adverse influence as to the image quality may occur. As a result, as explained above, the embedding strength is selected to be located within such a range between the minimum embedding strength and the maximum embedding strength.

It should also be noted that the above-described summations B1, B2, B3, and B4 may be obtained by adding the additional information, the block size, the embedding strength, and the pattern signal determined by the pattern attenuation ratio to the summation values D1, D2, D3, D4 obtained as to each of the four partial blocks before the pattern is superimposed every area. Conversely, if the summation values D1, D2, D3, D4, and the additional information can be known, then such an embedding strength required so as to satisfy the above-described relationship may be obtained by way of a calculation. Also, if a plurality of combination tables between embedding strengths and pattern attenuation ratios, which are used many times, are previously calculated and built in tables, then such an embedding strength required for satisfying the above-described relationship may be simply obtained from the table against pattern attenuation ratio inputted from the pattern attenuation ratio input section 13.

As explained above, the embedding strength control section 71 calculates the optimum embedding strength, and the pattern generating section 14 forms the two patterns in accordance with this optimum embedding strength, and then, the formed pattern is embedded into the image data. As a result, while the degradation of the image qualities are suppressed, the identification ratio can be improved.

In this third embodiment, such an example has been exemplified that the pattern attenuation ratio is inputted, and the embedding strength is controlled so as to be adapted to the block image. Moreover, the present invention is not limited only to this example. For instance, conversely, while the input value is employed as the embedding strength, the pattern attenuation ratio may be variable in adaptation to the block image. In order to satisfy the above-described relative formulae, any one of the embedding strength and the pattern attenuation ratio may be fixed, and the other maybe obtained by way of the calculation. Alternatively, when such a table is prepared, the combinations between the embedding strengths and the pattern attenuation ratios, which are required for satisfying the above-explained relative formulae, may be simply obtained. This table contains summations of 4-divided pixel values of the superimposing pattern in the plural combinations between the embedding strengths and the pattern attenuation ratios, which are used many times.

An additional information extracting device side of the image processing apparatus according to the third embodiment of the present invention is similar to that of the above-explained first embodiment. As a consequence, explanations thereof are omitted.

Fourth Embodiment

Figure 21:
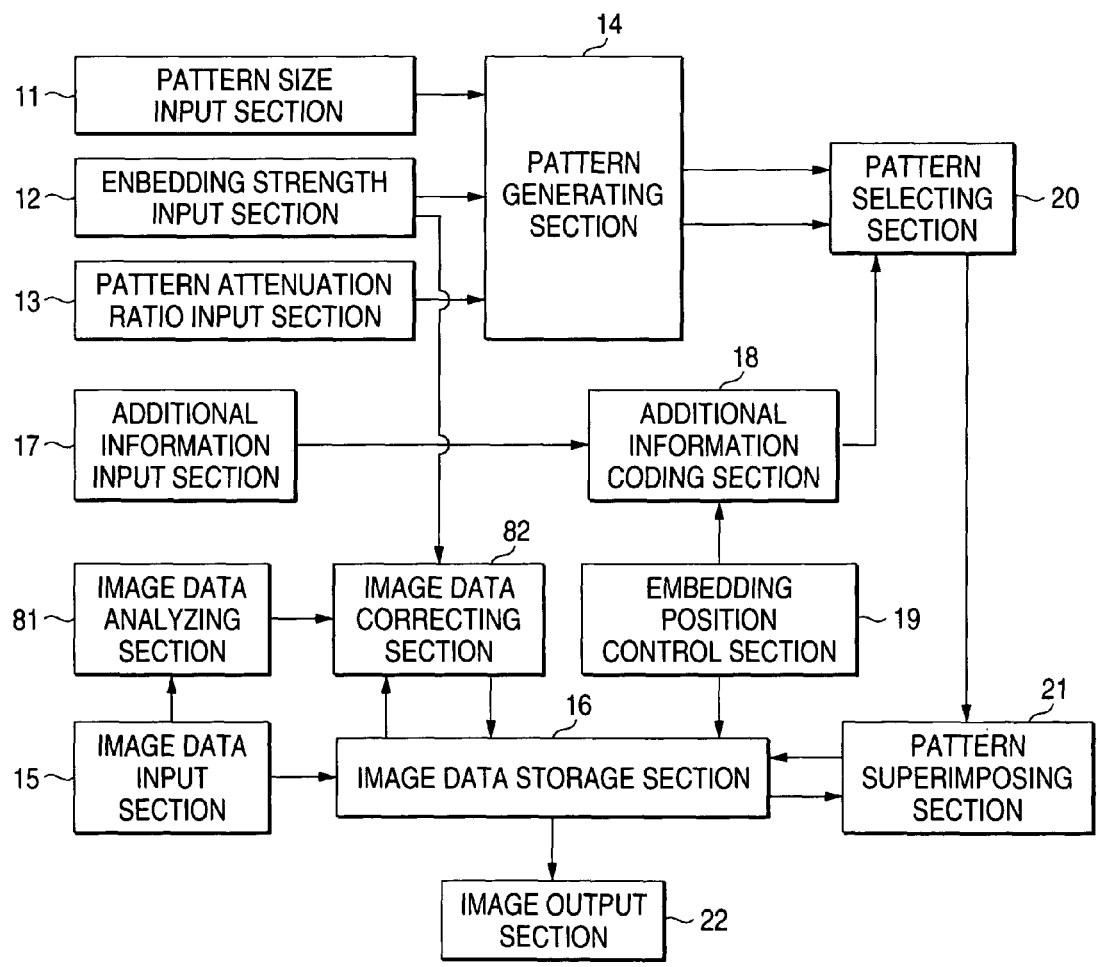
FIG. 21 is a block diagram for indicating one structural example of an additional information embedding side according to a fourth embodiment of the present invention.

Next, a description will now be given on a fourth embodiment of the present invention. FIG. 21 is a block diagram for indicating one structural example of an additional information embedding side according to the fourth embodiment. It should be noted that the same reference numerals shown in FIG. 1 will be employed as those for denoting the same, or similar structural elements of FIG. 21, and explanations thereof may be omitted. Reference numeral 81 indicates an image data analyzing section, and reference numeral 82 shows an image data correcting section. In the arrangements explained in the above-described embodiments, when a pattern is superimposed with a highlight (bright) portion and a shadow (dark) portion of inputted image data, there are some possibilities that an overflow may occur, and an underflow may occur. In the respective embodiments, the value is changed into either the maximum value of the pixel values or the minimum value of the pixels in such a case. As a result, the identifying performance of the pattern embedded in the highlight portion and the shadow portion is reduced. In this fourth embodiment, such an arrangement capable of solving these problems is indicated.

In this fourth embodiment, both the image data analyzing section 81 and the image data correcting section 82 are added to the arrangement of the first embodiment. The image data analyzing section 81 detects both a maximum pixel value and a minimum pixel value, which are owned by an input image with respect to each of color components of this input image, for example, R, G, B color components, or Y, M, C, K color components.

If the color data storage section 16 owns, for example, 8-bit gradation (256 color gradation values) every color component, namely one color component may be expressed by 0 to 255 gradation values, then the image data correcting section 82 executes a density converting operation based upon an embedding strength "C" inputted from the embedding strength input section 12, the above-described maximum pixel value, and the above-explained minimum pixel value in such a manner that each of the color components of the input image is inputted between C and (255-C). Concretely speaking, assuming now that a maximum pixel value of a certain color component and a minimum pixel value thereof are "Cmax" and "Cmin" respectively which are obtained by the image data analyzing section 81, a pixel value Z(Cmin$\leq$Z$\leq$Cmax) owned by this color component is converted into Z' in accordance with the following formula:

$$Z' = [(\min(255 - C, C\max) - \max(C, C\min))/(C\max - C\min) \times$$
$$(Z - C\min) + \max(C, C\min),$$

where symbol "min (a, b)" implies that a smaller value within "a" and "b" is employed, and symbol "max (a, b)" implies that a larger value within "a" and "b" is employed.

This converting operation implies that the gradation range [Cmin . . . Cmax] is linear-converted into [max(C, Cmin) . . . min(255-C, Cmax)]. As a consequence, even when the pattern signal is superimposed with the gradation-converted image at the embedding strength "C", either a gradation value smaller than 0, or another gradation value which exceeds 255 does not appear.

Other structural units of this fourth embodiment are similar to those of the above-explained first embodiment. These structural units will now be summarized as follows: The pattern generating section 14 forms two patterns based upon an inputted/set pattern size, an embedding strength, and a calculated pattern attenuation ratio. The two patterns to be formed own similar features to those of the above-described first embodiment. The image input section 15 inputs thereinto image data. The image data storage section 16 is used so as to record input image data, to record input image data corrected by the image data correcting section 82, to temporarily hold work data during process operation, and to hold output data. The additional information input section 17 inputs additional information which is embedded into input image data from a personal computer, and software, which are not shown. The additional information to be embedded into the input image data may be realized by a character string, a numeral, or image data. The additional information coding section 18 converts the additional information inputted by the additional information input section 17 into a predetermined coding format, and then, forms embedding information which is actually embedded into image data. The embedding position control section 19 designates such a position that the embedding information is embedded into the image data stored in the image data storage section 16 in accordance with a predetermined embedding format. The pattern selecting section 20 selects any one of the two patterns formed by the pattern generating section 14 based upon the embedding information formed by the additional information coding section 18. The pattern superimposing section 21 adds such a pattern selected by the pattern selecting section 20 with respect to such an image block, while this image block is located at an address of the image data storage section 16, which is designated by the embedding position control section 19. Since the input image data has been corrected by the image data correcting section 82, neither an overflow, nor an underflow occurs due to this addition of the selected pattern. The image output section 22 outputs an image into which the additional information has been embedded with respect to an image output device such a printer. As previously explained, while the deteriorations of the image qualities are suppressed to a minimum allowable value, the pattern identifying ratio can be improved.

In this arrangement of the fourth embodiment, both the image data analyzing section 81 and the image data correcting section 82 are additionally provided with the arrangement shown in the first embodiment. The present invention is not limited to this arrangement. For example, both the image data analyzing section 82 and the image data correcting section 82 may be alternatively added to the above-described arrangement of either the second embodiment or the third embodiment.

A structure of an additional information extracting device side provided in the image processing apparatus according to the fourth embodiment of the present invention is similar to that of the above-described first embodiment. As a consequence, explanations of this additional information extracting device structure are omitted.

In the above-explained respective embodiments, both the pattern adding operation and the pattern extracting operation may be desirably carried out with respect to all of color components when the input image is a color image. Alternatively, both the pattern adding operation and the pattern extracting operation may be carried out with respect to at least one of these color components.

Also, the image processing operations in the above-described respective embodiments may be executed by a computer apparatus in accordance with a program which is read out from an external storage medium.

As apparent from the foregoing description, in accordance with the present invention, since the additional information is embedded into the image having the multi-gradation values by employing the pattern having the above-explained features, even when the image processing operations such as the resolution conversion of the image output device and of the image input device have been executed with respect to this image, the additional information embedded in this image can be firmly detected and recovered from the image printed on the paper. At this time, the information such as the pattern size is not required to be notified from the additional information embedding side to the additional information extracting device side. Also, the additional information can be embedded and recovered even when the input/output devices are widely combined with each other. In addition, since the pattern corresponding to the additional information is embedded, the degradation in the image qualities in the original image can be suppressed. In accordance with the present invention, such an effect and the above-described various effects may be achieved.

What is claimed is:

1. An image processing apparatus comprising:
a pattern generating section for generating two patterns;
an image input section for inputting an input image;
an additional information input section for inputting additional information;
a pixel position designating section for designating an image position at which the pattern is superimposed on the input image inputted by the image input section; and
a pattern superimposing section for selecting one of the two patterns generated by the pattern generating section based on the additional information to superimpose the selected pattern on the image position in the input image designated by the pixel position designating section,
wherein when corresponding pixels in two patterns are added to each other, all of elements become zero;
wherein when all of pixels in each of patterns are added to each other, the added pixels become zero;
wherein each of patterns has two edges, which include discontinuous pixel values and pass through a center portion of each of patterns in difference directions from each other;
wherein absolute values of pixel values of the patterns is the largest at a center thereof; and
wherein the absolute values of pixel values of the patterns decrease as being away from the center thereof.

2. The image processing apparatus according to claim 1, further comprising:
an embedding strength input section for inputting an embedding strength,
wherein the pattern generating section generates the two patterns by using the embedding strength inputted by the embedding strength input section.

3. The image processing apparatus according to claim 2, further comprising:
a pattern attenuation ratio calculating section for calculating a pattern attenuation ratio based on at least the embedding strength inputted by the embedding strength input section,
wherein absolute values of pixel values of the patterns is the largest at a center thereof;
wherein the absolute values of pixel values of the patterns decrease as being away from the center thereof; and
wherein the pattern generating section generates the two patterns by using the embedding strength inputted by the embedding strength input section and the pattern attenuation ratio calculated by the pattern attenuation ratio calculating section.

4. The image processing apparatus according to claim 3, wherein the pattern attenuation ratio calculating section sets the pattern attenuation ratio in such a manner that a difference of pixels values at a boundary portion between the patterns arranged adjacent to each other is smaller than a predetermined value.

5. The image processing apparatus according to claim 3, further comprising:
a pattern size input section for inputting a pattern size,
wherein the patterns have n×m pixels;
wherein the pattern attenuation rate calculating section calculates the pattern attenuation rate by further using the pattern size inputted by the pattern size input section; and
wherein the pattern generating section generates the two patterns by using the embedding strength inputted by the embedding strength section, the pattern attenuation rate calculated by the pattern attenuation rate calculating section, and the pattern size inputted by the pattern size input section.

6. The image processing apparatus according to claim 1, further comprising:
a pattern attenuation ratio input section for inputting a pattern attenuation ratio,
wherein the pattern generating section generates the two patterns by using the pattern attenuation ratio inputted by the pattern attenuation ratio input section.

7. The image processing apparatus according to claim 1, further comprising:
an embedding strength control section for determining one of an embedding strength and a pattern attenuation ratio based on the additional information obtained by the additional information input section and the input image at the image position designated by the pixel position designating section, wherein the pattern generating section generates the two patterns by using the one of the embedding strength and the pattern attenuation ratio set by the embedding strength control section.

8. The image processing apparatus according to claim 7, wherein the embedding strength control section sets the input image at the image position designated by the pixel position designating section as a block;

wherein the embedding strength control section subdivides the block into four blocks by two edges corresponding to the pattern selected by the superimposing section;

wherein the embedding strength control section obtains total sum of pixel values of each subdivided block; and wherein the embedding strength control section determines the embedding strength and/or the pattern attenuation ratio based on the four total sums and the additional information obtained from the additional information input section.

9. The image processing apparatus according to claim 7, further comprising:

a minimum embedding strength input section for inputting a minimum embedding strength; and a maximum embedding strength input section for inputting a maximum embedding strength, wherein the embedding strength control section sets the input image at the image position designated by the pixel position designating section as a block;

wherein the embedding strength control section subdivides the block into four blocks by two edges corresponding to the pattern;

wherein the embedding strength control section obtains total sum of pixel values of each subdivided block; and wherein the embedding strength control section determines the embedding strength and the pattern attenuation ratio based on the minimum embedding strength inputted by the minimum embedding strength section, the maximum embedding strength inputted by the maximum embedding strength input section, the four total sums, and the additional information obtained from the additional information input section.

10. The image processing apparatus according to claim 1, wherein the directions of the edges of the patterns, which pass through the center portion, are a vertical direction and a horizontal direction, respectively.

11. The image processing apparatus according to claim 1, further comprising:

an additional information coding section for converting the additional information inputted by the additional information input section into embedding information in a predetermined coding format, wherein the pattern superimposing section selects the one of the two patterns generated by the pattern generating section in accordance with the embedding information converted by the additional information coding section.

12. An image processing apparatus comprising:

a pattern generating section for generating two patterns;

an image input section for inputting an input image;

an embedding strength input section for inputting an embedding strength;

an image analyzing section for analyzing the input image inputted by the image input section;

an input image correcting section for correcting the input image based on the embedding strength inputted by the embedding strength input section;

an additional information input section for inputting additional information;

a pixel position designating section for designating an image position at which a pattern is superimposed on the input image corrected by the input image correcting section; and a pattern superimposing section for selecting one of the two patterns generated by the pattern generating section based on the additional information to superimpose the selected pattern on the image position in the input image corrected by the input image correcting section at the image position designated by the pixel position designating section, wherein when corresponding pixels in two patterns are added to each other, all of elements become zero;

wherein when all of pixels in each of patterns are added to each other, the added pixels become zero; and wherein each of patterns has two edges, which include discontinuous pixel values and pass through a center portion of each of patterns in difference directions from each other.

13. The image processing apparatus according to claim 12, wherein the input image correcting section corrects the input image so that a gradation value of the input image is in a range, which is set based on the embedding strength inputted by the embedding strength input section.

14. The image processing apparatus according to claim 12, wherein the input image correcting section corrects the input image so that the pixel value of the input image is in a range of from a first value to a second value;

wherein the first value is a pixel value, which is obtained by subtracting the embedding strength inputted by the embedding strength input section from a minimum pixel value, which the input image can have; and wherein the second value is a pixel value, which is obtained by subtracting the embedding strength inputted by the strength input section from a maximum pixel value, which the input image can have.

15. The image processing apparatus according to claim 12, wherein the image analyzing section detects a maximum pixel value and a minimum pixel value in the input image.

16. The image processing apparatus according to claim 12, wherein the patterns each have n×m pixels.

17. The image processing apparatus according to claim 16, further comprising:

a pattern size input section for inputting a pattern size, wherein the pattern generating section generates the two patterns by using the pattern size inputted by the pattern size input section.

18. An image processing apparatus for extracting additional information from image data into which the additional information has been embedded in units of a block having patterns of a plurality of pixels, the image processing apparatus comprising:

an image data input section for inputting the image data into which the additional information has been embedded;

a block size predicting section for predicting a size of the block from the image data into which the additional information has been embedded;

a block position detecting section for detecting a position of the block from the image data into which the additional information has been embedded; and an additional information identifying section for identifying the additional information, which has been embedded into the block, based on the position of the block detected by the block position detecting section, wherein the patterns are two kinds of patterns;

wherein when corresponding pixels in two patterns are added to each other, all of elements become zero;

wherein when all of pixels in each of patterns are added to each other, the added pixels become zero;

wherein each of patterns has two edges, which include discontinuous pixel values and pass through a center portion of each of patterns in difference directions from each other;

wherein the block size predicting section predicts the size of the block based on that the edges are arranged in the image in a regular manner;

wherein the block position detecting section detects the position of the block by utilizing correlation between the image data into which the additional information has been added and a mask image, which is formed by extracting only polarity information from one of the two patterns; and wherein the additional information identifying section identifies the additional information by using large/small relationships among total sums of pixel values of four areas, which are subdivided by the edges.

19. The image processing apparatus according to claim 18, wherein the block size predicting section forms an edge extracted image from the image data;

wherein the block size predicting section forms an image in which an edge component along a predetermined direction is extracted from the edge extracted image; and wherein the block size predicting section obtains the size of the block from an interval of peak positions of an autocorrelation function of the image.

20. The image processing apparatus according to claim 19, wherein the directions of the edges, which pass through the center portion of the patterns, are a vertical direction and a horizontal direction; and wherein the block size predicting section extracts the edge components along the vertical direction and the horizontal direction.

21. The image processing apparatus according to claim 18, wherein the block position detecting section forms the mask image corresponding to the size of the block obtained by the block size predicting section;

wherein the block position detecting section carries out convolution calculation between the mask image and the image data;

wherein the block position detecting section extracts a point of a local maximum value and a point of a local minimum value from the convolution calculation result;

wherein the block position detecting section projects the point of the local maximum value and the point of the local minimum value to the vertical direction and the horizontal direction; and wherein the block position detecting section detects the position of the block based on projected waveform and the size of the block obtained by the block size calculating section.

22. The image processing apparatus according to claim 18, wherein the additional information identifying section subdivides the block detected by the block position detecting section into the four areas by the two edges in the predetermined directions;

wherein the additional information identifying section calculates the total sums of the pixel values in the four areas; and wherein the additional information identifying section identifies the additional information based on the large/small relationships among the four total sums.

23. The image processing apparatus according to claim 18, further comprising:

an skew correcting section for correcting a skew of the image data inputted by the image data input section, wherein the block size predicting section, the block position detecting section, and the additional information identifying section execute the process operations by using the image data skew of which is corrected by the skew correcting section.

24. The image processing apparatus according to claim 18, further comprising:

an additional information decoding section for decoding the additional information identified by the additional information identifying section in accordance with a previously prescribed coding format.

25. An image processing method comprising:

inputting an input image;

inputting additional information to be embedded into the input image;

selecting one of two patterns in accordance with the additional information; and superimposing the selected pattern on a designated position in the input image to embed the additional information into the input image, wherein when corresponding pixels in the two patterns are added to each other, all of elements become zero;

wherein when all of pixels in each of patterns are added to each other, the added pixels become zero;

wherein each of patterns has two edges, which include discontinuous pixel values and pass through a center portion of each of patterns in difference directions from each other;

wherein absolute values of pixel values of the patterns is the largest at a center thereof; and wherein the absolute values of pixel values of the patterns decrease as being away from the center thereof.

26. The image processing method according to claim 25, further comprising:

inputting an embedding strength; and generating the two patterns by using the embedding strength.

27. The image processing method according to claim 26, further comprising:

calculating a pattern attenuation ratio based on at least the embedding strength, wherein absolute values of pixel values of the patterns is the largest at a center thereof;

wherein the absolute values of pixel values of the patterns decrease as being away from the center thereof; and wherein in the step of generating the two patterns, the two patterns are generated by using the embedding strength and the calculated pattern attenuation ratio.

28. The image processing method according to claim 27, wherein in the step of calculating the pattern attenuation ratio, the pattern attenuation ratio is set so that a difference of pixels values at a boundary portion between the patterns arranged adjacent to each other is smaller than a predetermined value.

29. The image processing method according to claim 27, further comprising:
inputting a pattern size,
wherein the patterns have n×m pixels;
wherein in the step of calculating the pattern attenuation ratio, the pattern attenuation ratio is calculated by using the pattern size; and
wherein in the step of generating the patterns, the two patterns are generated by using the embedding strength, the pattern attenuation ratio, and the pattern size.

30. The image processing method according to claim 25, further comprising:
inputting a pattern attenuation ratio; and
generating the two patterns by using the pattern attenuation ratio.

31. The image processing method according to claim 25, further comprising:
determining one of an embedding strength and a pattern attenuation ratio based on the inputted additional information and the input image at the image position where the pattern corresponding to the additional information is superimposed; and
generating the two patterns by using the one of the embedding strength and the pattern attenuation ratio.

32. The image processing method according to claim 31, wherein the step of determining the one of the embedding strength and the pattern attenuation ratio comprising:
setting the input image at the image position where the pattern is superimposed as a block;
subdividing the block into four blocks by two edges, which correspond to the pattern and pass through a center portion thereof;
obtaining total sum of pixel values of each four subdivided block; and
determining the one of the embedding strength and the pattern attenuation ratio based on the four total sums and the additional information.

33. The image processing method according to claim 31, wherein the step of determining the one of the embedding strength and the pattern attenuation ratio comprising:
setting the input image at the image position where the pattern is superimposed as a block;
subdividing the block into four blocks by two edges, which correspond to the pattern and pass through a center portion thereof;
obtaining total sum of pixel values of each four subdivided block;
calculating the embedding strength based on the four total sums and the additional information;
setting minimum value of the inputted embedding strength as the embedding strength when the calculated embedding strength is smaller than the minimum value of the inputted embedding strength; and
setting maximum value of the inputted embedding strength as the embedding strength when the calculated embedding strength is larger than the maximum value of the inputted embedding strength.

34. The image processing method according to claim 25, wherein the patterns have n×m pixels.

35. The image processing method according to claim 34, further comprising:
inputting a pattern size; and
generating the two patterns by using the pattern size.

36. The image processing method according claim 25, wherein the directions of the edges of the patterns, which pass through the center portion, are a vertical direction and a horizontal direction, respectively.

37. The image processing method according to claim 25, further comprising:
converting the inputted additional information into embedding information in a predetermined coding format,
wherein in the step of selecting one of the two patterns, the one of the two patterns is selected in accordance with the embedding information.

38. An image processing method comprising:
inputting an input image;
inputting additional information to be embedded into the input image;
inputting an embedding strength of the additional information;
analyzing the input image;
correcting the input image based on the embedding strength of the inputted additional information and the analysis result of the input image;
generating two patterns in accordance with the embedding strength of the additional information;
selecting one of the two patterns in accordance with the additional information; and
superimposing the selected pattern on a designated position in the corrected input image to embed the additional information into the corrected input image,
wherein when corresponding pixels in two patterns are added to each other, all of elements become zero;
wherein when all of pixels in each of patterns are added to each other, the added pixels become zero; and
wherein each of patterns has two edges, which include discontinuous pixel values and pass through a center portion of each of patterns in difference directions from each other.

39. The image processing method according to claim 38, wherein in the step of correcting the input image, the input image is corrected so that a gradation value of the input image is in a range, which is set based on the inputted embedding strength.

40. The image processing method according to claim 38, wherein in the step of correcting the input image, the input image is corrected so that the pixel value of the input image is in a range of from a first value to a second value;
wherein the first value is a pixel value, which is obtained by subtracting the inputted embedding strength from a minimum pixel value, which the input image can have; and
wherein the second value is a pixel value, which is obtained by subtracting the inputted embedding strength inputted from a maximum pixel value, which the input image can have.

41. The image processing method according to claim 38, wherein in the step of analyzing the input image, a maximum pixel value and a minimum pixel value in the input image are obtained.

42. An image processing method for extracting additional information from image data into which the additional information has been embedded in units of a block having patterns of a plurality of pixels, the method comprising:

inputting the image data into which the additional information has been embedded;

predicting a size of the block from the image data;

detecting a position of the block from the image data;

identifying the additional information embedded into the block based on the detected position of the block, wherein the patterns are two kinds of patterns;

wherein when corresponding pixels in two patterns are added to each other, all of elements become zero;

wherein when all of pixels in each of patterns are added to each other, the added pixels become zero;

wherein each of patterns has two edges, which include discontinuous pixel values and pass through a center portion of each of patterns in difference directions from each other;

wherein in the step of predicting the size of the block, the size of the block is predicted based on that the edges are arranged in the image in a regular manner;

wherein in the step of detecting the position of the block, the position of the block is detected by utilizing correlation between the image data into which the additional information has been added and a mask image, which is formed by extracting only polarity information from one of the two patterns; and wherein in the step of identifying the additional information, the additional information is identified by using large/small relationships among total sums of pixel values of four areas, which are subdivided by the edges.

43. The image processing method according to claim 42, wherein the step of predicting the size of the block comprises:

forming an edge extracted image from the image data;

forming an image in which an edge component along a predetermined direction is extracted from the edge extracted image; and obtaining the size of the block from an interval of peak positions of an autocorrelation function of the image.

44. The image processing method according to claim 43, wherein the directions of the edges, which pass through the center portion of the patterns, are a vertical direction and a horizontal direction; and wherein the step of predicting the size of the block comprises extracting the edge components along the vertical direction and the horizontal direction.

45. The image processing method according to claim 42, wherein the step of detecting the position of the block comprises: forming the mask image corresponding to the predicted size of the block;

carrying out convolution calculation between the mask image and the image data;

extracting a point of a local maximum value and a point of a local minimum value from the convolution calculation result;

projecting the point of the local maximum value and the point of the local minimum value to the vertical direction and the horizontal direction; and detecting the position of the block based on projected waveform and the predicted size of the block.

46. The image processing method according to claim 42, wherein the step of identifying the additional information comprises: subdividing the block the position of which is detected into the four areas by the two edges in the predetermined directions;

calculating the total sums of the pixel values in the four areas;

identifying the additional information based on the large/small relationships among the four total sums.

47. The image processing method according to claim 42, further comprising:

correcting a skew of the inputted image data, wherein the step of predicting the size of the block, the step of detecting the position of the block, and the step of identifying the additional information utilizes the corrected image data.

48. The image processing method according to claim 42, further comprising:

decoding the identified additional information in accordance with a previously prescribed coding format.

49. A computer-readable program storage medium for storing a program which causes a computer to execute a process comprising:

inputting an input image;

inputting additional information to be embedded into the input image;

selecting one of two patterns in accordance with the additional information; and superimposing the selected pattern on a designated position in the input image to embed the additional information into the input image, wherein when corresponding pixels in the two patterns are added to each other, all of elements become zero;

wherein when all of pixels in each of patterns are added to each other, the added pixels become zero;

wherein each of patterns has two edges, which include discontinuous pixel values and pass through a center portion of each of patterns in difference directions from each other;

wherein absolute values of pixel values of the patterns is the largest at a center thereof; and wherein the absolute values of pixel values of the patterns decrease as being away from the center thereof.

* * * * *